(12) United States Patent
Nakamura et al.

(10) Patent No.: US 8,211,623 B2
(45) Date of Patent: *Jul. 3, 2012

(54) INK COMPOSITION, INKJET RECORDING METHOD, PRINTED MATERIAL, METHOD FOR PRODUCING PLANOGRAPHIC PRINTING PLATE, AND PLANOGRAPHIC PRINTING PLATE

(75) Inventors: Ippei Nakamura, Shizuoka-ken (JP); Masaharu Sugai, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/851,133

(22) Filed: Aug. 5, 2010

(65) Prior Publication Data

US 2010/0298494 A1 Nov. 25, 2010

Related U.S. Application Data

(62) Division of application No. 11/646,368, filed on Dec. 28, 2006, now Pat. No. 7,794,918.

(30) Foreign Application Priority Data

Dec. 28, 2005 (JP) ................................. 2005-380032
Dec. 28, 2005 (JP) ................................. 2005-380033

(51) Int. Cl.
G03F 7/00 (2006.01)
G03F 7/26 (2006.01)
B41F 1/00 (2006.01)

(52) U.S. Cl. .................. 430/302; 430/281.1; 101/463.1; 101/453; 522/178

(58) Field of Classification Search ................ 430/281.1, 430/302; 522/178, 140, 222, 471; 427/595
See application file for complete search history.

(56) References Cited

U.S. PATENT DOCUMENTS

| 4,888,269 | A | 12/1989 | Sato et al. |
| 6,305,787 | B1 | 10/2001 | Nakazawa et al. |
| 7,470,015 | B2 * | 12/2008 | Fukushige ................... 347/100 |
| 2003/0138231 | A1 * | 7/2003 | Takemura et al. ........... 385/128 |
| 2003/0210879 | A1 * | 11/2003 | Oshio et al. .................. 385/128 |
| 2004/0152799 | A1 | 8/2004 | Miller et al. |
| 2004/0191465 | A1 * | 9/2004 | Murayama et al. ........ 428/65.5 |
| 2005/0130065 | A1 | 6/2005 | Hiraoka |
| 2006/0111466 | A1 * | 5/2006 | Bujard et al. ................. 523/160 |
| 2006/0128823 | A1 | 6/2006 | Tsuchimura et al. |
| 2006/0134554 | A1 | 6/2006 | Ragnetti et al. |

FOREIGN PATENT DOCUMENTS

| DE | 103 08 971 A1 | 9/2004 |
| EP | 1 674 537 A2 | 6/2006 |
| JP | 05-214280 A | 8/1993 |
| JP | 08-501108 A | 2/1996 |
| JP | 2000-247015 A | 9/2000 |
| JP | 2003-246818 A | 9/2003 |
| JP | 2004-224841 A | 8/2004 |
| JP | 2005539390 A | 12/2005 |
| WO | 2004/076569 A1 | 9/2004 |
| WO | 2004/106437 A1 | 12/2004 |
| WO | WO 2004106437 A1 * | 12/2004 |

OTHER PUBLICATIONS

Extended European Search Report corresponding to European Application No. 06 02 6999, dated Jan. 21, 2008.
Goodrich, James, et al., "UV Ink Jet-Development of Unique Raw Materials"., Society for Imaging Science and Technology, 21st International Conference on Digital Printing Technologies Final Program and Proceeding, (2005), 324-311.
Japanese Office Action issued in corresponding Application No. 2005-380033 dated Sep. 6, 2011.
Corresponding Japanese Office Action (Decision of refusal) and the English Translation thereof issued in Japanese Application No. 2005-380032) dated Nov. 29, 2011.
Corresponding Japanese Office Action (Notice of reasons for rejections) and the English Translation thereof issued in Japanese Application No. 2005-380033) dated Nov. 29, 2011.

* cited by examiner

*Primary Examiner* — Cynthia Kelly
*Assistant Examiner* — Chanceity Robinson
(74) *Attorney, Agent, or Firm* — Sughrue Mion, PLLC

(57) ABSTRACT

The invention provides an ink composition having at least (A) a polymerization initiator, (B) an ester or amide of (meth) acrylic acid having a 1,3-dioxolane ring skeleton or a 1,3-dioxane ring skeleton or (B') an ester or amide of (meth) acrylic acid having a 1,3-diketone structure, and (C) a colorant. The invention further provides an inkjet recording method and a method for producing a planographic printing plate, each of which includes at least (I) ejecting the ink composition onto a hydrophilic support and (II) curing the ink composition by irradiating the ejected ink composition with active radiation so as to form a hydrophobic image region on the hydrophilic support. The invention furthermore provides a planographic printing plate formed by the method for producing a planographic printing plate.

9 Claims, No Drawings

INK COMPOSITION, INKJET RECORDING METHOD, PRINTED MATERIAL, METHOD FOR PRODUCING PLANOGRAPHIC PRINTING PLATE, AND PLANOGRAPHIC PRINTING PLATE

This is a Divisional of U.S. patent application Ser. No. 11/646,368 filed Dec. 28, 2006, which claims priority based on JP 2005-380032, filed on Dec. 28, 2005 and JP 2005-380033, filed on Dec. 28, 2005. The entire disclosures of the prior applications are considered part of the disclosure of the accompanying divisional application, and are hereby incorporated by reference.

BACKGROUND OF THE INVENTION

1. Field of the Invention

The present invention is related to an ink composition suitable for inkjet recording, an inkjet recording method, a printed material obtained by using the inkjet recording method, a planographic printing plate obtained by using the ink composition, and a method for producing a planographic printing plate. Specifically, the invention is related to an ink composition which cures with high sensitivity upon irradiation with radiation to form a high-quality image and which has high storage stability, an inkjet recording method, a printed material obtained by using the ink composition, a planographic printing plate obtained by using the ink, and a method for producing the planographic printing plate. The present invention further relates to inkjet apparatuses are simple and create less noise.

2. Description of the Related Art

Methods for forming an image on an image recording medium such as paper based on an image data signal include electrophotographic methods, sublimation-type thermal transfer methods, melt-type thermal transfer methods, and inkjet methods. In electrophotographic methods, a process of forming an electrostatic latent image on a photoreceptor drum by charging and exposure to light is required, and the process makes the system complicated, resulting in problems of increased production cost and the like. Thermal transfer methods can be applied to inexpensive apparatuses; however, the use of ink ribbons increases the running cost and generates wastes.

Inkjet recording methods are applicable to inexpensive apparatuses, and can reduce the running cost. This is because an image is directly formed by providing ink only to image portions on the support, thereby improving the efficiency in the use of ink. Further, the ink jet recording methods generate less noise, and are excellent image forming methods.

Ink compositions curable by irradiation with radiation such as ultraviolet rays, especially inkjet inks (radiation-curable inkjet ink), are requested to have sufficiently high sensitivity and capability of forming high-quality images. When the sensitivity of such inks is heightened, the inks cure efficiently upon application of radiation, whereby a lot of benefits are provided including reduced electric power consumption, longer life of radiation generator owing to reduced load, and prevention of generation of low-molecular substances caused by insufficient curing. Further, when ink compositions (inkjet inks in particular) are used for the formation of the image areas on planographic printing plates, higher sensitivity increases the curing strength of the image areas, thus achieving higher printing durability.

Examples of conventionally-proposed ultraviolet-curing ink compositions include an ink composition using a mixture of a plurality of monomers possessing different degrees of functionality (for example, see Japanese Patent Application Laid-Open (JP-A) No. 5-214280). However, in order to maintain a curing speed with using such an ink composition, it is inevitable to use a multifunctional monomer in a large quantity and, for this reason, there is a problem in flexibility of an image after an ink therein is cured.

Planographic printing plates have been conventionally manufactured by using so-called PS plates. The PS plate has a configuration including a hydrophilic support and a lipophilic photosensitive resin layer. The planographic printing plates have been manufactured by a method including image-forming by exposing the photosensitive resin layer imagewise so as to increase or decrease the solubility of the exposed portion with respect to an alkali developer and removing a non-image portion by dissolving. In recent years, however, digital technology in which image information is processed, stored, and outputted electronically by computer is becoming more and more popular, and there is a need for a new image-output method compatible with the digital technology. Particularly, methods which enable direct production of printing plates without a treatment using a developer have been investigated, and methods of directly forming planographic printing plates by using ink compositions for inkjet recording are under development. The methods of directly forming planographic printing plates include ejecting, by an inkjet method or the like, an ink onto a surface of a support imagewise, the support preferably being hydrophilic, and irradiating activated radiation so as to cure the ink, in order to obtain a printing plate having a desired image, which is preferably a hydrophobic image. In order to form an image portion of a planographic printing plate, it is desirable to obtain the properties of rapid curing of ink droplets ejected onto a support without blurring, excellent strength of a cured image, excellent adherence of a cured image to a support, and excellent flexibility to an extent that allows for bending of a support when the planographic printing plate is applied to a printer without incurring damage such as cracks, and thus ink compositions satisfying these properties are currently sought after.

Accordingly, there has been a need for an ink composition which cures with high sensitivity upon irradiation with activated radiation, is capable of forming a high-quality image with superior adhesion to a recording medium, and preferably further has high flexibility, as well as a need for a method using such an ink composition.

There has also been a need for a planographic printing plate which is obtained by using an ink composition which cures with high sensitivity upon irradiation with activated radiation, (which is preferably ultraviolet ray,) as well as a need for a method for producing such a planographic printing plate.

SUMMARY OF THE INVENTION

The present invention has been made in consideration of the above problems of the conventional techniques. The inventors of the present invention have conducted intensive study and have devised the use of a specific polymerizable compound enables obtaining an ink composition having improved flexibility, increased ejectability, increased particle-shape storability and increased adherence to a recording medium so as to achieve the present invention.

Namely, as one aspect of the invention, the invention provides an ink composition, comprising: (A) a polymerization initiator; (B) an ester or amide of (meth)acrylic acid having a 1,3-dioxolane ring skeleton or a 1,3-dioxane ring skeleton, or (B') an ester or amide of (meth)acrylic acid having a 1,3-diketone structure; and (C) a colorant.

While the action of the present invention is not clear, it is considered to be as described below.

When (B) an ester or amide of (meth)acrylic acid having a 1,3-dioxolane ring skeleton or a 1,3-dioxane ring skeleton is used as a polymerizable compound in an ink composition, the curing speed of the composition at the time of exposure is improved. For this reason, even when the ink composition is constituted by a monofunctional monomer excellent in curing sensitivity as a major component without adding a large quantity of a multifunctional monomer, which is useful in improvement of curing sensitivity, there is no risk of deteriorating the sensitivity and the influence of addition of a multifunctional monomer on film properties, such as decreasing the flexibility of the film after curing, can be suppressed and, as a result, it is thought that the properties of the cured composition can be improved while maintaining the sensitivity.

The mechanism of the action of improvement of the curing speed is not clear, but it is thought that the polymerizable compound is favorably aligned for polymerization of the composition by an interaction between two oxygen atoms existing in the 1,3-dioxolane ring skeleton or the 1,3-dioxane ring skeleton, or that the influence of oxygen in the air, which is a polymerization inhibitory component, can be reduced due to an increase in the polarity of the composition by the two oxygen atoms.

Further, when (B) an ester or amide of (meth)acrylic acid having a 1,3-diketone structure is used as a polymerizable compound in the ink composition, the curing speed of the composition at the time of exposure is improved.

The mechanism of the action of improvement of the curing speed is not clear but it is thought that, since the polarity of the composition is increased by the two oxygen atoms existing in the 1,3-diketone structure, the influence of oxygen in the air, which is a polymerization inhibitory component, is reduced, or an interaction between polymerizable compounds caused by the two oxygen atoms exerts an influence. Further, it is also thought that, since the 1,3-diketone structure can form an interaction with the materials of a recording medium on which the ink composition is applied and with, among these materials, an inorganic material represented by a metal support, such as aluminum, used when preparing a planographic printing plate using the ink composition, adhesion to the support is also improved. Since the interaction formed based on the 1,3-diketone structure, which is effective in improvement of the curing speed or improvement of adhesion to the support, is not as strong as that formed based on a protogenic polarity, the impact on adaptability to an inkjet is small when it is used as a composition for an inkjet and reduction of flexibility caused by formation of an interaction after curing can be suppressed and, accordingly, film properties can be improved without deteriorating the flexibility thereof.

In a case where a colored image is formed using the ink composition, the ink composition may further contain a colorant.

The ink composition of the invention is preferably applicable for inkjet recording since, when irradiated with radiation, it cures with high sensitivity, and the flexibility of a film formed on the surface of the ink is improved. Namely, as one embodiment of the invention, the invention provides an inkjet recording composition comprising the ink composition.

As another aspect of the invention, the invention provides an inkjet recording method, comprising: (i) ejecting the ink composition onto a recording medium; and (ii) irradiating the ejected ink composition with active radiation to cure the ink composition.

As still another aspect of the invention, the invention provides a method for producing a planographic printing plate, comprising: (I) ejecting the ink composition onto a hydrophilic support; and (II) curing the ink composition by irradiating the ejected ink composition with active radiation so as to form a hydrophobic image region on the hydrophilic support.

As still another aspect of the invention, the invention further provides a planographic printing plate, being produced by a method comprising: (I) ejecting an ink composition onto a hydrophilic support; and (II) curing the ink composition by irradiating the ejected ink composition with active radiation so as to form a hydrophobic image region on the hydrophilic support.

DETAILED DESCRIPTION

Ink Composition

The ink composition of an embodiment according to the invention contains at least: (A) a polymerization initiator; (B) an ester or amide of (meth)acrylic acid having one of a 1,3-dioxolane ring skeleton and a 1,3-dioxane ring skeleton or (B') an ester or amide of (meth)acrylic acid having a 1,3-diketone structure; and (C) a colorant.

The ink composition according to the invention can favorably be used for inkjet recording.

Hereinafter, components essential to the ink composition according to the invention are sequentially described.
(B) Ester or Amide of (meth)acrylic Acid Having One of a 1,3-dioxolane Ring Skeleton and a 1,3-dioxane Ring Skeleton Hereinafter, an ester or amide of (meth)acrylic acid having either a 1,3-dioxolane ring skeleton or a 1,3-dioxane ring skeleton (hereinafter, appropriately referred to as (B) specific polymerizable compound) is described in detail.

Any compound can be used as the (B) components as long as it is an ester or amide of (meth)acrylic acid having a 1,3-dioxolane ring skeleton or a 1,3-dioxane ring skeleton. Examples of the ester or amide of (meth)acrylic acid having the 1,3-dioxane ring skeleton include a compound represented by the following Formula (I), and examples of the ester or amide of (meth)acrylic acid having the 1,3-dioxolane ring skeleton include a compound represented by the following Formula (II).

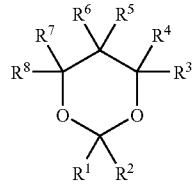

Formula (I)

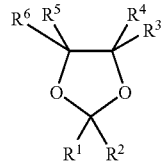

Formula (II)

In Formulae (I) and (II), each of R1 to R8 independently represents a hydrogen atom or a hydrocarbon group. At least one of R1 to R8 in Formula (I) and at least one of R1 to R6 in Formula (II) respectively have a structure of an ester or amide of (meth)acrylic acid as a substituent at a terminal thereof.

When one or more of R1 to R8 represent(s) hydrocarbon groups, such hydrocarbon groups are preferably those each having from about 1 to about 18 carbon atoms and, specific examples thereof include an alkyl group, an aryl group, an aralkyl group, an alkenyl group and a cycloalkyl group. Among these, an alkyl group is preferable.

When one or more of R1 to R8 represent(s) alkyl groups, the alkyl groups are preferably straight-chain or branch-chain alkyl groups each having from about 1 to about 8 carbon atoms and, among these, straight-chain alkyl groups each having from 1 to 4 carbon atoms are more preferable, and a methyl group or an ethyl group is particularly preferable.

The structure of the ester or amide of (meth)acrylic acid which, in Formula (I), at least one of R1 to R8 and, in Formula (II), at least one of R1 to R6 have at an end thereof as a substituent is preferably a monovalent organic group represented by the following Formula (III) or (IV):

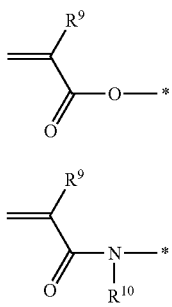

In Formulae (III) and (IV), $R^9$ represents a hydrogen atom or a methyl group and, from the standpoint of reactivity and flexibility of a polymer to be generated by a polymerization reaction, a hydrogen atom is preferable. $R^{10}$ has the same scope as those of the above-described $R^1$ to $R^8$, and $R^{10}$ preferably represents a hydrogen atom. The mark * as used in Formulae (III) and (IV) indicates a position to be linked with any one of $R^1$ to $R^8$ in Formulae (I) and (II).

The structure of the ester or amide of (meth)acrylic acid is preferably a monovalent organic group represented by Formula (III) from the standpoint of viscosity of the composition and properties thereof after cured.

The ester or amide of (meth)acrylic acid existing as a substituent at each terminal of R1 to R8 in Formula (I) and R1 to R6 in Formula (II) preferably exists in a number of one or two in a molecule and more preferably one in a molecule from the standpoint of viscosity of the compound or properties of the cured composition.

Among these (B) specific polymerizable compounds, an ester or amide of (meth)acrylic acid having a 1,3-dioxane ring skeleton is preferable from the standpoint of a curing speed, and a compound represented by Formula (I) having one monovalent organic group represented by Formula (III) in the molecule is particularly preferable.

While specific examples of such esters or amides of (meth) acrylic acid each having a 1,3-dioxolane ring skeleton or a 1,3-dioxane ring skeleton are described below as exemplary compounds (B-1) to (B-16), the present invention is by no means limited thereto. Further, when stereoisomers are present in these exemplary compounds, any one of these stereoisomers may be used and mixtures thereof may also be used in the invention.

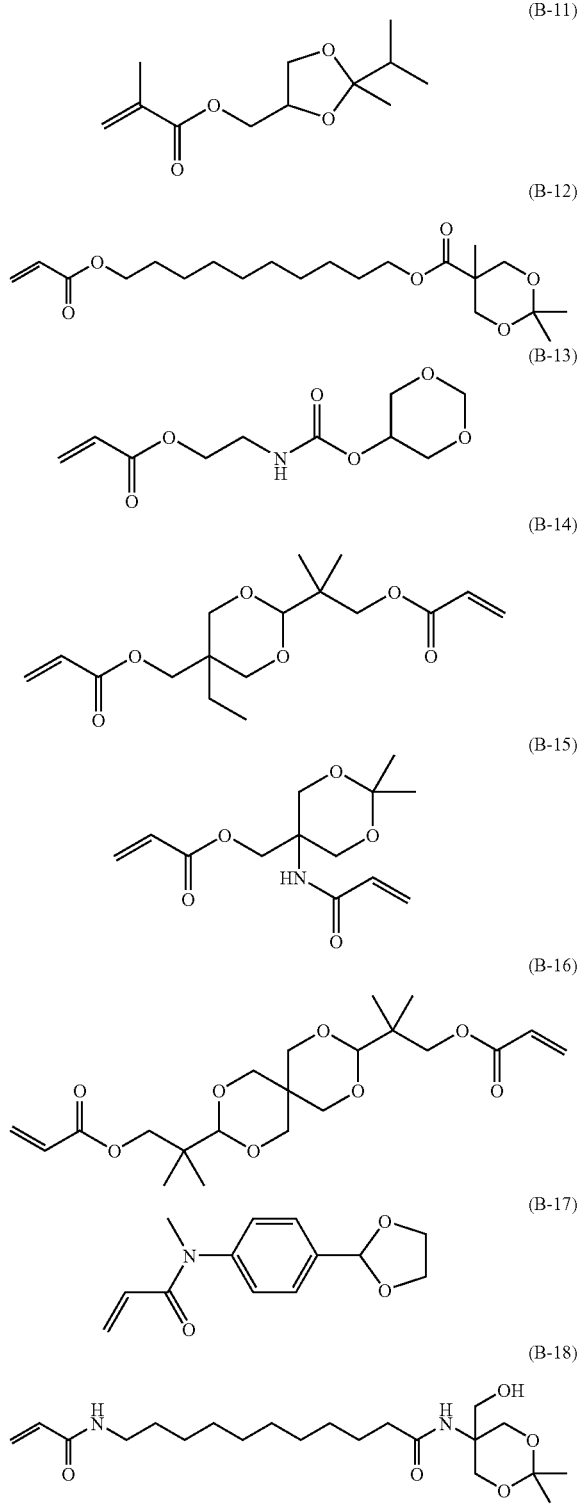

A content of the (B) specific polymerizable compound in the ink composition of an embodiment of the invention is in a range of 3 to 35% by mass and, more preferably in a range of 4 to 25% by mass on the basis of the total mass of the ink composition from the standpoints of a balance between a curing speed and an adhesion to the substrate and an inkjet adaptability of the ink composition.

The (B) specific polymerizable compounds may be used singly or in a mixture of two types or more.

(B') Ester or Amide of (Meth)Acrylic Acid Having a 1,3-diketone Structure

Hereinafter, an ester or amide of (meth)acrylic acid having a 1,3-diketone structure (hereinafter, appropriately referred to as (B') specific polymerizable compound) is described in detail.

Any compound can be used as the (B') component as long as it is an ester or amide of (meth)acrylic acid having a 1,3-diketone structure. Any structure can be used as the 1,3-diketone structure as long as it has a carbon atom at each end of adjacent three carbons is in a carbonyl form. The carbon atom in the center of the adjacent three carbon atoms is preferably a methylene group (—$CH_2$—) having no substituent.

It is necessary that the adjacent three carbon atoms which constitute the 1,3-diketone structure are bonded to an organic group having an ester or amide of (meth)acrylic acid. An atom or an atomic group which is adjacent to the adjacent three carbon atoms which constitute the 1,3-diketone structure may each be a hetero atom such as an oxygen atom or a nitrogen atom and may come to form an ester bond, an amide bond or the like in the end together with the atom or the atomic group adjacent to the carbonyl group of the 1,3-diketone. From the standpoint of flexibility of the cured composition or a mutual interaction with the support, the 1,3-diketone structure in the (B') compound is preferably not contained in a ring structure. Namely, in a preferable embodiment, the 1,3-diketone structure in the (B') compound exist outside of a ring structure.

The number of the structure derived of (meth)acrylic acid which is present in a molecule of the ester or amide of (meth) acrylic acid having the 1,3-diketone structure may be one or more. The number of the structure derived of (meth)acrylic acid is preferably in a range of 1 to 6, and is more preferably 1 or 2. In a particularly preferable embodiment, the ester or amide of (meth)acrylic acid having the 1,3-diketone structure is an ester or amide of a monofunctional (meth)acrylic acid having one structure which is derived of (meth)acrylic acid.

Preferable examples of the ester or amide of (meth)acrylic acid having a 1,3-diketone structure include a compound represented by the following Formula (I').

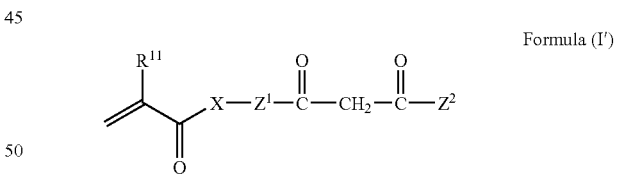

Formula (I')

In Formula (I'), $R^{11}$ represents a hydrogen atom or a methyl group. From the standpoint of reactivity and flexibility of a polymer to be generated by a polymerization reaction, $R^{11}$ preferably represents a hydrogen atom.

X represents an oxygen atom or $NR^{12}$. From the standpoint of improvement of mobility in the periphery of a polymerizable portion, X preferably represents an oxygen atom. $R^{12}$ represents a hydrogen atom or an alkyl group. $R^{12}$ preferably represents a hydrogen atom or an alkyl group having from 1 to 4 carbon atoms, and more preferably represents a hydrogen atom.

$Z^1$ represents a single bond or a divalent organic group. When $Z^1$ represents a divalent organic group, a number of atoms which are contained in the divalent organic group and are other than hydrogen atoms is preferably in a range of 1 to 7. More specific examples thereof include an alkylene group having about 1 to about 7 carbon atoms. Any single methylene group (—CH$_2$—) or a group of a plurality of adjacent methylene groups in the alkylene group may be substituted by substituent(s) such as a divalent organic group having an unsaturated bond such as an arylene group or an alkenyl group, a divalent organic group having a hetero atom or a halogen atom such as a carbonyl group, a hydroxymethylene group, an alkoxymethylene group, an aminomethylene group or a halogenated methylene group, an oxygen atom, a sulfur atom or the like. Among such organic groups, an alkylene group having from 1 to 7 carbon atoms or a group in which a methylene group at one terminal is substituted with an oxygen atom are particularly preferable as the divalent organic group represented by $Z^1$. In a preferable embodiment, the divalent organic group represented by $Z^1$ is bonded to the 1,3-diketone structure via an oxygen atom. Namely, X, that is the atom adjacent to $Z^1$ and links $Z^1$ with the 1,3-diketone structure, is preferably an oxygen atom.

$Z^2$ represents a monovalent organic group. $Z^2$ is preferably a hydrocarbon group. More specifically, examples of the hydrocarbon group represented by $Z^2$ include an alkyl group having about 1 to 12 carbon atoms and an aryl group having about 1 to 12 carbon atoms. Among these, an alkyl group having from 1 to 8 carbon atoms is more preferred, and a methyl group is particularly preferred.

Specific examples of the ester or amide of (meth)acrylic acid having a 1,3-diketone structure which can be favorably used in the present invention include the following exemplary compounds (B'-1) to (B'-9). Among these compounds, the compounds (B'-1) to (B'-6) are preferred, and (B'-1) or (B'-2) are particularly preferred.

It is noted that the invention is by no means limited thereto.

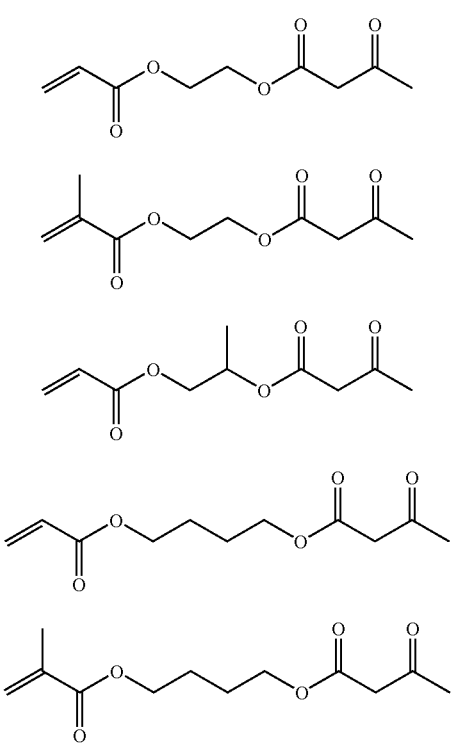

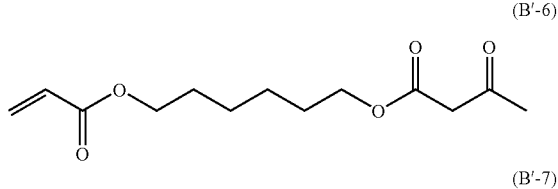

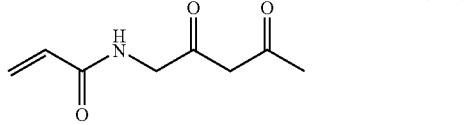

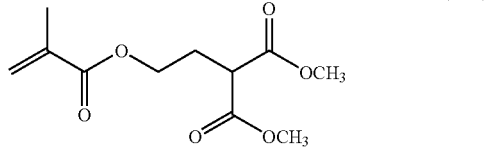

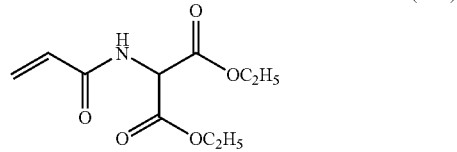

A content of the (B') specific polymerizable compound in the ink composition of an embodiment is in a range of 3 to 45% by mass and, more preferably in a range of 4 to 35% by mass relative to the total mass of the ink composition from the standpoint of a balance between the curing speed and adhesion to the substrate and inkjet adaptability of the ink composition.

The (B') specific polymerizable compounds may be used singly or in a mixture of two or more thereof.

(A) Polymerization Initiator

The ink composition according to the invention further contains a polymerization initiator. Any conventionally-known polymerization initiator can be appropriately selected and used as the polymerization initiator of the ink composition of the invention in accordance with kinds of polymerizable compounds used therewith and utilization purposes of the ink composition. It is preferable that the polymerization initiator used in the invention is a radical polymerization initiator.

The polymerization initiator used in the ink composition of the invention is a compound which generates a polymerization initiation starter upon absorbing external energy. The external energy is roughly classified into heat, to which thermal polymerization initiators are applied, and radiation ray, to which photopolymerization initiators are applied. Examples of the radiation ray include γ-rays, β-rays, electron beams, ultraviolet rays, visible rays, and infrared rays.

Any conventionally-known thermal polymerization initiators and photopolymerization initiators can be used in the invention.

Preferable examples of the radical polymerization initiator used in the invention include (a) aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds containing a carbon-halogen bond, and (m) alkylamine compounds.

The radical polymerization initiator may be used singly or in combination of two or more thereof in the invention.

The (A) polymerization initiator used in the invention is preferably contained in a range of 0.01 to 35% by mass, more preferably in a range of 0.1 to 30% by mass, and still more preferably in a range of 0.5 to 30% by mass on the basis of a total amount of the above-described (B) and (B') components. Alternatively, when the component of the (B) or (B') specific polymerizable compound is used in combination with a compound of (D) additional polymerizable compound which is an arbitrary component to be described below, the content ranges are calculated on the basis of an entire amount of the polymerizable compounds.

Further, it is appropriate that the (A) polymerization initiator is contained in the ink composition so that a mass ratio of an amount of the polymerization initiator to an amount of an (E) sensitizing colorant described below becomes in a range of 200:1 to 1:200, preferably in a range of 50:1 to 1:50, and more preferably in a range of 20:1 to 1:5.

The ink composition according to the invention may further contain one or more other components in addition to the above required components as long as they do not impair the effects of the invention.

Explanations regarding these other components are provided hereinafter.

(D) Additional Polymerizable Compounds

In addition to the (B) or (B') specific polymerizable compound, the ink composition according to the invention may further contain an (D) additional polymerizable compound which is other than the (B) or (B') specific polymerizable compound. Examples of such additional compound that can be used in combination with the (B) or (B') specific polymerizable compound include radical polymerizable compound and cation-polymerizable compound. The (D) additional polymerizable compound may be appropriately selected and used in consideration of desired characteristics and a relationship with the (A) polymerization initiator.

In the invention, a total content of the polymerizable compounds, namely, a total content of the (B) or (B') component and a total content of the (D) additional polymerizable compound which can be simultaneously used therewith is in a range of 45 to 95% by mass, and preferably in a range of 50 to 90% by mass on the basis of the mass of the total content of the ink composition according to the invention.

Further, in the ink composition according to the invention, the content of the (B) or (B') component is preferably 7% by mass or more, more preferably 10% by mass or more, and further preferably 15% by mass or more on the basis of the total content of the polymerizable compounds (namely, the total content of the (B) or (B') component and the total content (D) component) contained in the ink composition.

Explanations regarding the additional polymerizable compound which can be used in the invention are provided hereinafter.

The radical-polymerizable compound is a compound having a radical-polymerizable ethylenic unsaturated bond, and may be any compound as long as it has at least one radical-polymerizable ethylenic unsaturated bond in the molecule. The chemical form of the compound may be a monomer, oligomer, polymer, or the like. The radical-polymerizable compound may be used singly or in combination of two or more thereof with an arbitrary mixing ratio for improving desired properties. It is preferable that two or more multifunctional compounds are used in combination in view of controlling the reactively and the properties such as physical properties.

Examples of the radical-polymerizable compound having a radical-polymerizable ethylenic unsaturated bond include: unsaturated carboxylic acids such as acrylic acid, methacrylic acid, itaconic acid, crotonic acid, isocrotonic acid or maleic acid; salts thereof, and anhydrides thereof; acrylonitrile; styrene; various unsaturated polyesters; unsaturated polyethers; unsaturated polyamides; unsaturated unsaturated urethanes; and the like.

Specific examples thereof include esters or amides of acrylic acid such as 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane (having a weight average molecular weight of more than 360), polyethylene glycol diacrylate (having a weight average molecular weight of more than 360), polypropylene glycol diacrylate (having a weight average molecular weight of more than 360), dipentaerythritol tetraacrylate, trimethylol propane triacrylate, oligoester acrylate, N-methylol acrylamide, diacetone acryloamide, or epoxyacrylate; esters or amides of methacrylic acid such as methyl methacrylate, n-butyl methacrylate, allyl methacrylate, glycidyl methacrylate, benzyl methacrylate, dimethylaminomethyl methacrylate, polyethylene glycol dimethacrylate (having a weight average molecular weight of more than 360), polypropylene glycol dimethacrylate (having a weight average molecular weight of more than 360), or 2,2-bis(4-methacryloxypolyethoxyphenyl)propane (having a weight average molecular weight of more than 360); and esters or amides of an allyl compound such as allyl glycidyl ether, diallyl phthalate, or triallyl trimellitate. More specifically, radical polymerizable or crosslinkable monomers, oligomers and polymers commercially available or known in the art are also usable, such as those described in Shinzo Yamashita Ed., "Crosslinking Agent Handbook", (1981, Taisei Publishing); Kiyoshi Kato Ed., "UV-EB Curing Handbook (Raw Material)" (1985, Kobunshi Kankokai); RadTech Japan Ed., "Application and Market of UV-EB Curing Technology", p. 79, (1989, CMC); and Eiichiro Takiyama, "Polyester Resin Handbook", (1988, Nikkankogyo Shimbun), the disclosures of which are incorporated herein by reference.

Examples of the radical-polymerizable compound which may be used in the invention further include photo-curing polymerizable compounds used in the photopolymerizable compositions described in JP-B No. 7-31399 and JP-A Nos. 7-159983, 8-224982, 10-863, and 9-134011.

Preferable examples of the radical-polymerizable compound further include a vinyl ether compound. Specific examples thereof include divinyl or trivinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexane dimethanol divinyl ether, hydroxyethyl monovinyl ether, hydroxynonyl monovinyl ether, or trimethylolpropane trivinyl ether; monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl ether-o-propylene carbonate, dodecyl vinyl ether, diethylene glycol monovinyl ether, or octadecyl vinyl ether; and the like.

Among these vinyl ether compounds, from the standpoint of curability, adhesion property, and surface hardness, divinyl ether compounds and trivinyl ether compounds are preferable, and divinyl ether compounds are particularly preferable.

The vinyl ether compounds may be used singly or in combination of two or more thereof in accordance with necessity.

Examples of the additional polymerizable compound further include (meth)acrylic acid esters such as a (meth)acrylic monomer, a (meth)acrylic prepolymer, an epoxy monomer, an epoxy prepolymer, an urethane monomer or an urethane prepolymer (hereinafter arbitrarily called as an acrylate compound). Specific examples of such additional polymerizable compound include compounds described below.

Namely, specific examples of the acrylate compound include 2-ethylhexyl-diglycol acrylate, 2-hydroxy-3-phenoxypropyl acrylate, 2-hydroxybutyl acrylate, hydroxypivalic acid neopentylglycol diacrylate, 2-acryloyloxyethyl phtharic acid, methoxy-polyethylene glycol acrylate, tetramethylolmethane triacrylate, 2-acryloyloxyethyl-2-hydroxyethyl phtharic acid, dimethyloltricyclodecane diacrylate, ethoxylated phenyl acrylate, 2-acryloyloxyethyl succinic acid, nonylphenol EO adduct acrylate, modified glycerin triacrylate, bisphenol A diglycidyl ether acrylic acid adduct, modified bisphenol A diacrylate, phenoxy-polyethylene glycol acrylate, 2-acryloyloxyethylhexahydrophthalic acid, bisphenol A PO adduct diacrylate, bisphenol A EO adduct diacrylate, dipentaerythritol hexacrylate, pentaerythritol triacrylate, tolylene diisocyanate urethane prepolymer, lactone-modified flexible acrylate, butoxyethyl acrylate, propylene glycol diglycidyl ether acrylic acid adduct, pentaerythritol triacrylate hexamethylene diisocyanate urethane prepolymer, 2-hydroxyethyl acrylate, methoxydipropylene glycol acrylate, ditrimethylolpropane tetracrylate, pentaerythritol triacrylate hexamethylenediisocyanate urethane prepolymer, stearyl acrylate, isoamyl acrylate, isomyristyl acrylate, isostearyl acrylate, and lactone-modified acrylate.

These acrylate compounds are preferable since they are polymerizable compounds conventionally used in UV curable inks as they are less irritative or less sensitizing to skin (having small inductively of rashes on the skin) and can provide a stable ink-ejecting property with a relatively low viscosity as well as a good polymerization sensitivity and a good adhesion to a recording medium.

Even though these monomers described as the (D) additional polymerizable compounds have a low molecular weight, each of them has a low sensitizing property, a high reactivity, a low viscosity, and an excellent adhesion to the recording medium.

From the viewpoint of improving sensitivity, resistance to bleeding, and adhesion property to recording media, it is preferable to additionally use, as a component (D), a combination of the monoacrylate and either a polyfunctional acrylate monomer or oligomer having a molecular weight of 400 or more (preferably 500 or more).

It is particularly preferable to use a combination of a monoacrylate monomer selected from the above, a component selected from the (B) specific polymerizable compound, and either the polyfunctional acrylate monomer or the polyfunctional acrylate oligomer in an ink composition used for recording to flexible recording media such as PET films or PP films, because such a combination can further improve the adhesion to recording media by providing flexibility to a film formed by the ink composition while increasing a strength of the film.

In a particularly preferable embodiment of the invention uses a combination of three kinds of polymerizable compound, (namely, a monofunctional acrylate monomer, a bifunctional acrylate monomer, and a polyfunctional acrylate monomer having tri- or higher-functionality). Such a combination provides improvements in the sensitivity, resistance to bleeding, and adhesion to recording media while securing safety.

The monoacrylate is preferably stearyl acrylate, isoamyl acrylate, isomyristyl acrylate, or isostearyl acrylate since they provide high sensitivity and low shrinking property to prevent curling, as well as preventing bleeding and odor of printed materials and reduction of cost of an irradiation apparatus.

In the invention, when any one of the acrylate compounds as described above is used as the (D) additional polymerizable compound, an amount of the acrylate compound is preferably 30% by mass or more, more preferably 40% by mass or more and, still more preferably 50% by mass or more based on a total mass of the additional polymerizable compound(s) (namely, a total amount of the (D) component). Further, all of the (D) additional polymerizable compounds to be simultaneously used can be selected from among the above-described acrylate compounds.

The selection of the polymerization initiator and the polymerizable compound in the invention may be done in accordance with various purposes such as the prevention of the deterioration in sensitivity caused by the light-shielding effect of the colorant used in the ink composition. For example, the ink composition may contain a combination of the radical polymerizable compound and the radical polymerization initiator. Alternatively, the ink composition may be formed as a radical-cation hybrid curable ink using both of the combination of the radical polymerizable compound and the radical polymerization initiator and a combination of a cation-polymerizable compound and a cation polymerization initiator.

There is no particular restriction to the cation-polymerizable compound used in the invention as long as it starts a polymerization reaction upon acid generated by a photo-acid generating agent so as to be cured, and various cation-polymerizable monomers known as photo-cation-polymerizable monomers can be used as the cation-polymerizable compound in the invention. Examples thereof include the epoxy compounds, vinyl ether compounds, and oxetane compounds such as those described in JP-A Nos. 6-9714, 2001-31892, 2001-40068, 2001-55507, 2001-310938, 2001-310937 or 2001-220526, the disclosures of which are incorporated herein by reference.

Examples of the cation-polymerizable compound which may be used in the invention further include conventionally-known polymerizable compounds used for photo-curing resins of cation-polymerization system. For example, the polymerizable compounds described in JP-A Nos. 6-43633 or 8-324137 can be used as the polymerizable compounds applied to photo-curing resins of photocation polymerization system sensitized in the wavelength range of visible rays of 400 nm or more.

Examples of a cationic polymerization initiator (photolytically acid-generating agent) to be usable in combination with the cationically polymerizable compound include a chemical amplification-type photo resist or a compound used for light cationic polymerization (Japanese Research Association for Organic Electronics Materials Ed., "Organic Materials for Imaging" (published by Bun-Shin Shuppan (1993), pp. 187 to 192). Preferable examples of the cationic polymerization initiators used in the invention will be described below.

Firstly, B(C6F5)4-salts, PF6-salts, AsF6-salts, SbF6-salts, or CF3SO3-salts of aromatic onium compound of diazonium, ammonium, iodonium, sulfonium, or phosphonium can be mentioned.

Secondly, a sulfone compound which generates a sulfonic acid can be mentioned.

Thirdly, a halogenide which generates hydrogen halide can also be used.

Fourthly, an iron allene complex can be mentioned.

These cationic polymerization initiators as described above may be used singly or in a mixture thereof.

(C) Colorant

While it is not specifically required to form a colored image in such a case where the ink composition of the invention is used for forming an image portion of a planographic printing plate, a colorant may be added to the ink composition of the invention for purposes such as improving visibility of a formed image portion or forming a colored image by using the ink composition.

While the colorant to be used is not particularly limited, (C-1) pigments and (C-2) oil-soluble dyes are preferable due to their resistance against weathering as well as color reproductivity, and may be arbitrarily selected from known colorants such as soluble dyes. The colorant used in the ink composition according to the invention preferably does not function as a polymerization inhibitor in the polymerization reaction, which is the curing reaction, so that the curing reaction with active rays is not inhibited.

(C-1) Pigment

The pigment for use in the invention is not particularly limited, and examples thereof include organic or inorganic pigments having the following Color Index numbers:

Red or magenta pigments such as Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, or Pigment Orange 13, 16, 20, or 36;

Blue or cyan pigments such as Pigment Blue 1, 15, 15:1, 15:2, 15:3, 15:4, 15:6, 16, 17-1, 22, 27, 28, 29, 36, or 60;

Green pigments such as Pigment Green 7, 26, 36, or 50;

Yellow pigments such as Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, or 193;

Black pigments such as Pigment Black 7, 28, or 26; and

White pigments such as Pigment White 6, 18, or 21.

Hereinafter, the oil-soluble dye for use in the invention will be described.

The oil-soluble dye for use in the invention is a dye that is substantially insoluble in water. Specifically, the oil-soluble dye has a solubility in water at 25° C. (the weight of the dye soluble in 100 g of water) of 1 g or less, preferably 0.5 g or less, and more preferably 0.1 g or less. Thus, the oil-soluble dye means a so-called water-insoluble pigment or an oil-soluble colorant, and among them, an oil-soluble colorant is preferable.

When the oil-soluble dye used in the present invention is a yellow dye, the yellow dye is not particularly limited. Examples thereof include: aryl- or heteryl-azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethine oxonol dyes; quinone dyes such as naphthoquinone dyes and anthraquinone dyes; as well as quinophtharone dyes, nitro-nitroso dyes, acridine dyes, and acridinone dyes.

When the oil-soluble dye used in the present invention is a magenta dye, the magenta dye is not particularly limited. Examples thereof include: aryl- or heteryl-azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, and anthrapyridones; and fused polycyclic dyes such as dioxazine dyes.

When the oil-soluble dye used in the present invention is a cyan dye, the cyan dye is not particularly limited. Examples thereof include azomethine dyes such as indoaniline dyes, indophenol dyes, and dyes having a pyrrolotriazole as the coupling component; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl- or heteryl-azo dyes having a coupling component such as a phenol, a naphthol, or an aniline; and indigo thioindigo dyes.

The dye may develop a color (yellow, magenta, or cyan) only after the dissociation of a part of its chromophore. At dissociation, the counter cation may be an inorganic cation such as an alkali metal or ammonium, or an organic cation such as a pyridinium or a quaternary ammonium salt; or a polymeric cation having, as a partial structure, a cation selected from those described above.

Preferable typical examples thereof include, but are not limited to: C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35, 38, 67 and 70; C.I. Solvent Green 3 and 7; and C.I. Solvent Orange 2. Particularly preferable among them are NUBIAN BLACK PC-0850, OIL BLACK HBB, OIL YELLOW 129, OIL YELLOW 105, OIL PINK 112, OIL RED 5B, OIL SCARLET 308, VALI FAST BLUE 2606, and OIL BLUE BOS (trade names, manufactured by Orient Chemical Industries); AIZEN SPILON BLUE GNH (trade names, manufactured by Hodogaya Chemical Co., Ltd.); NEOPEN YELLOW 075, NEOPEN MAZENTA SE1378, NEOPEN BLUE 808, NEOPEN BLUE FF4012, and NEOPEN CYAN FF4238 (trade names, manufactured by BASF).

The oil-soluble dye may be used singly or in combination of two or more thereof in the invention.

Another colorant such as other water-soluble dyes, other disperse dyes or other pigments may also be additionally used in the invention in such a range of an amount that does not inhibit the effects of the invention.

In the invention, a disperse dye may also be additionally used in such a range of an amount that the disperse dye is soluble in a water-immiscible organic solvent. Preferable specific examples thereof include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

After addition to the ink composition or the ink composition for ink jet recording according to the invention, the colorant for use in the invention is preferably dispersed in the ink to a suitable degree. Various dispersing machines, such as ball mills, sand mills, attriters, roll mills, agitators, Henschel mixers, colloid mills, ultrasonic wave homogenizers, pearl mills, wet jet mills, or paint shakers, may be used for dispersion of the colorant.

In an embodiment, a dispersant is added at dispersing the colorant. The dispersant is not particularly limited, and is preferably a polymer dispersant. The polymer dispersant may be selected, for example from SOLSPERSE series products manufactured by Zeneca. A synergist suitable for the pigment may be used as a dispersion aid. In the present invention, the dispersant and the dispersion aid are added preferably in an amount of 1 to 50 parts by weight with respect to 100 parts by weight of the colorant.

The colorant may be directly added to the inkjet composition together with other components. Alternatively, the colorant may be, in advance, added and uniformly dispersed to or dissolved in a solvent or a dispersing medium such as the (B) or (B') specific polymerizable compound used in the invention or the other (D) additional polymerizable compound which is used if desired, so as to improve the dispersibility.

In the invention, the colorant is preferably compounded by being added to one or a mixture of two or more of the (B) or (B') specific polymerizable compound(s) in advance in view of the prevention of the occurrence of problems such as the deterioration in solvent resistance caused by the remaining solvent in the cured image and VOCs (volatile organic compounds) caused by the residual solvent. The polymerizable compound to be used is preferably a monomer with a lowest viscosity, from the point of dispersion efficiency only.

These colorants may be suitably selected and used singly or in combination of two or more thereof depending on a utilization purpose of the ink composition.

In a case where a colorant which exists in a form of a solid material in the ink composition in the invention, the average diameter of the particles of the colorant is preferably set in the range of 0.005 to 1.5 µm, more preferably in the range of 0.01 to 1.2 µm, and still more preferably in the range of 0.015 to 0.1 µm by selection of the colorant, the dispersant, the dispersion medium, the dispersing conditions, and the filtration conditions. By controlling the particle diameter, it becomes possible to prevent clogging in head nozzles and to maintain favorable storage stability, transparency, and curing efficiency of the inkjet composition.

While the content of colorant in the ink composition is appropriately selected in accordance with utilization purposes, in consideration of physical properties and coloring property, it is generally preferably from 1 to 20% by weight, more preferably from 2 to 8% by weight, based on the entire weight of the ink composition.

(E) Sensitizing Dye

The ink composition according to the invention may contain a (E) sensitizing dye in order to promote degradation of the (A) polymerization initiator caused by irradiation of active ray. The sensitizing dye absorbs a specific active radiation to take an electronically excited state. The sensitizing dye in the electronically excited state contacts the polymerization initiator to cause electron transfer, energy transfer, heat generation, or the like. As a result, the polymerization initiator undergoes a chemical change to be decomposed, thereby generating radical, acid, or base.

Compounds which are adapted to a wavelength of active radiation which causes generation of a polymerization starter in the (A) polymerization initiator and used for the ink composition can be used as the sensitizing dye. In consideration of the application for curing reactions of general ink compositions, examples of the sensitizing dye according to the invention include the dyes belonging to the compound groups listed below as well as having an absorption wavelength in the wavelength range of 350 to 450 nm.

Typical examples thereof include polynuclear aromatic compounds (e.g., anthracene, pyrene, perylene, and triphenylene), thioxanthones (e.g., isopropyl thioxanthone), xanthenes (e.g., fluorescein, eosin, erythrocin, rhodamine B, and rose bengal), cyanines (e.g., thiacarbocyanine and oxacarbocyanine), merocyanines (e.g., merocyanine and carbomerocyanine), thiazines (e.g., thionine, methylene blue, and toluidine blue), acridines (e.g., acridine orange, chloroflavine, and acriflavine), anthraquinones (e.g., anthraquinone), squaryliums (e.g., squarylium), coumarins (e.g., 7-diethylamino-4-methylcoumarin) and the like. Preferable examples thereof include polynuclear aromatic compounds and thioxanthones.

More preferable examples of the sensitizing dye include the compounds represented by any one of the following Formulae (V) to (VIII).

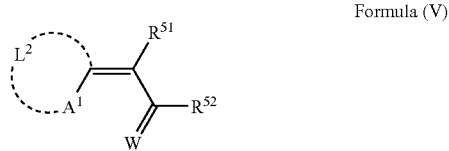

Formula (V)

In Formula (V), $A^1$ represents a sulfur atom or $NR^{50}$; $R^{50}$ represents an alkyl group or an aryl group; $L^2$ represents a non-metallic atomic group which forms a base nucleus of the sensitizing dye together with the adjacent $A^1$ and the adjacent carbon atom; each of $R^{51}$ and $R^{52}$ independently represents a hydrogen atom or a monovalent non-metallic atomic group, and $R^{51}$ and $R^{52}$ may be bonded with each other to form an acid nucleus of the sensitizing dye; and W represents an oxygen atom or a sulfur atom.

Formula (VI)

In Formula (VI), each of $Ar^1$ and $A^2$ independently represents an aryl group, and $Ar^1$ and $A^2$ are linked via the bonds from $L^3$; $L^3$ represents —O— or —S—; and W represents an oxygen atom or a sulfur atom.

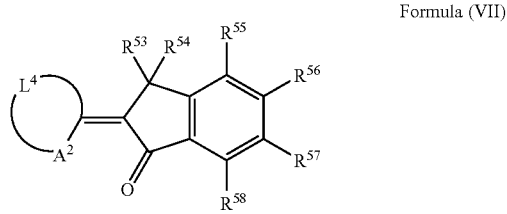

Formula (VII)

In Formula (VII), $A^1$ represents a sulfur atom or $NR^{59}$; $R^{50}$ represents an alkyl group or an aryl group; $L^4$ represents a non-metallic atomic group which forms a base nucleus of the sensitizing dye together with the adjacent $A^2$ and the adjacent carbon atom; and each of $R^{53}$, $R^{54}$, $R^{55}$, $R^{56}$, $R^{57}$ and $R^{58}$ independently represents a monovalent non-metallic atomic group.

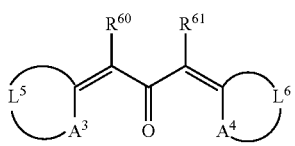

Formula (VIII)

In Formula (VIII), each of $Ar^3$ and $A^4$ independently represents —S—, —$NR^{62}$— or —$NR^{63}$—; each of $R^{62}$ and $R^{63}$ independently represents a substituted or non-substituted alkyl group or a substituted or non-substituted aryl group; $L^5$ represents a non-metallic atomic group which forms a base nucleus of the sensitizing dye together with the adjacent $A^3$ and the adjacent carbon atom; $L^6$ represents a non-metallic atomic group which forms a base nucleus of the sensitizing dye together with the adjacent $A^4$ and the adjacent carbon atom; and each of $R^{60}$ and $R^{61}$ independently represents a hydrogen atom or a monovalent non-metallic atomic group, and $R^{60}$ and $R^{61}$ may be bonded with each other to form an aliphatic ring or an aromatic ring.

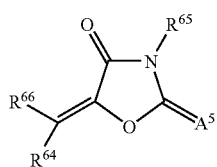

Formula (IX)

In Formula (IX), $R^{66}$ represents an a aromatic ring which may have a substituent or a hetero ring which may have a substituent; $A^5$ represents an oxygen atom, a sulfur atom or =$NR^{67}$; and each of $R^{64}$, $R^{65}$ and $R^{67}$ independently represents a hydrogen atom or a monovalent non-metallic atomic group, and each of the pair of $R^{67}$ and $R^{64}$ and the pair of $R^{65}$ and $R^{67}$ may be bonded with each other to form an aliphatic ring or an aromatic ring.

Specific preferable examples of the compounds represented by any one of Formulae (V) to (IX) is shown below, while the invention is not limited thereby.

(E-1)

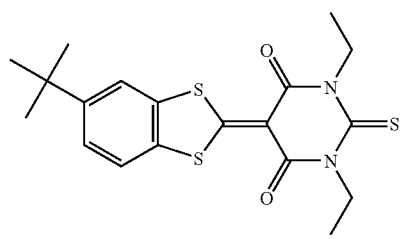

(E-2)

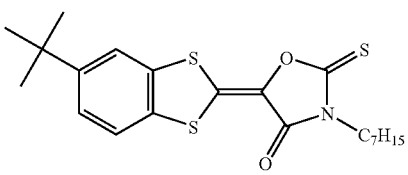

(E-3)

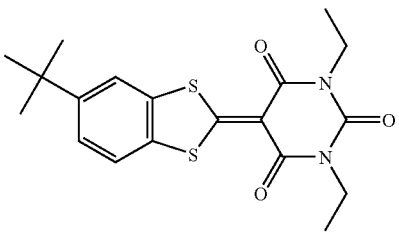

(E-4)

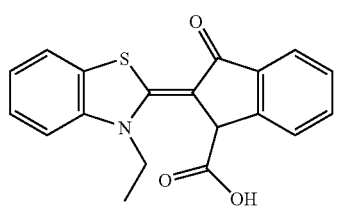

(E-5)

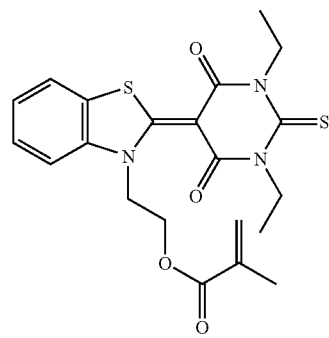

(E-6)

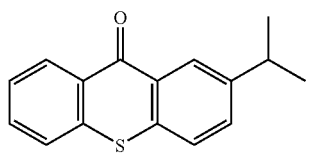

(E-7)

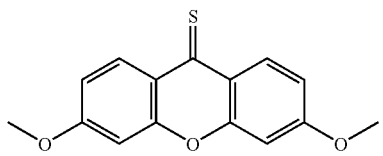

(E-8)

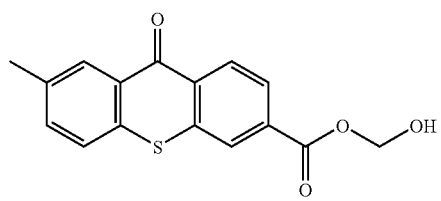

(E-9)

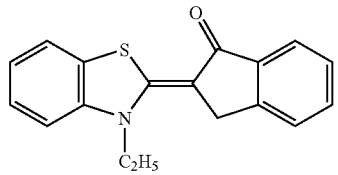

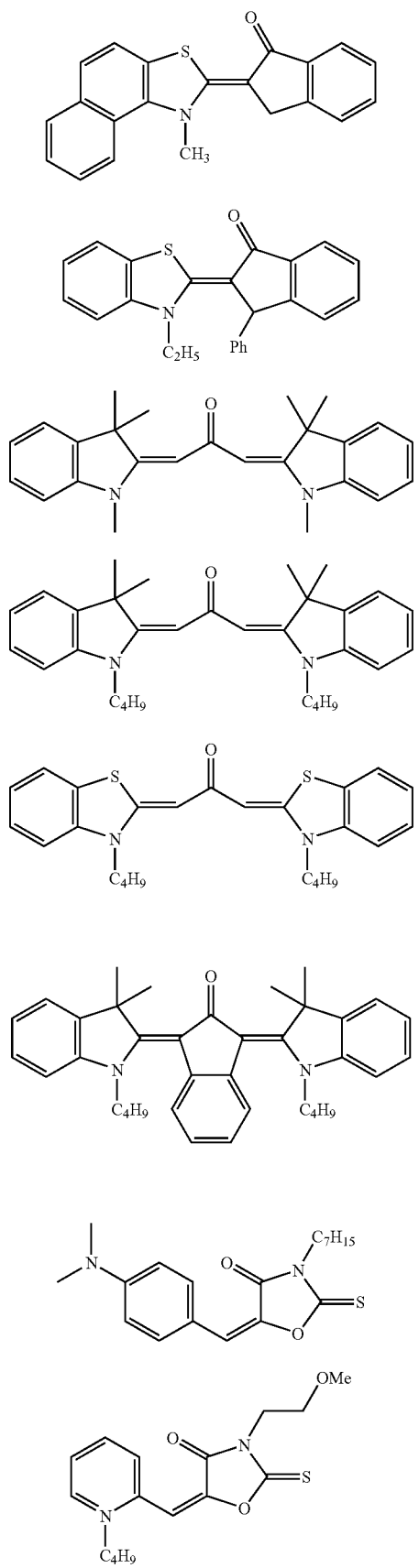

(E-10)
(E-11)
(E-12)
(E-13)
(E-14)
(E-15)
(E-16)
(E-17)

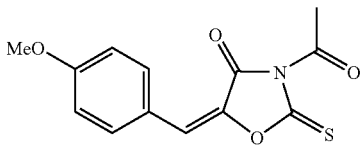

(E-18)

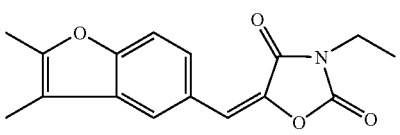

(E-19)

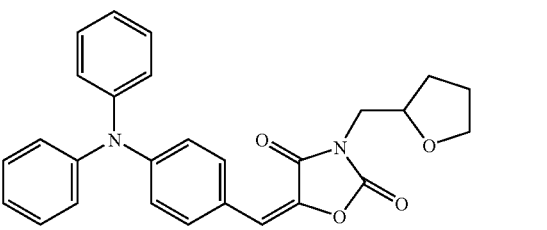

(E-20)

(F) Cosensitizer

In one embodiment, the ink composition according to the present invention may further contain a cosensitizer. The cosensitizer has functions of improving the sensitivity of the sensitizing dye to the active radiation, suppressing the polymerization inhibition by oxygen, and the like.

Examples of the cosensitizer include amines such as those described in M. R, Sander et al., "Journal of Polymer Society" vol. 10, p. 3173, (1972), JP-B No. 44-20189, JP-A Nos. 51-82102, 52-134692, 59-138205, 60-84305, 62-18537, and 64-33104 or Research Disclosure 33825 (the disclosures of which are incorporated herein by reference); and specific examples thereof include triethanolamine, ethyl p-dimethylaminobenzoate, p-formyldimethylaniline, p-methylthiodimethylaniline, and the like.

Other examples of the cosensitizer include thiols and sulfides, such as thiol compounds described in JP-A No. 53-702, JP-B No. 55-500806, or JP-A No. 5-142772 (the disclosures of which are incorporated herein by reference), or disulfide compounds described in JP-A No. 56-75643 (the disclosure of which is incorporated herein by reference). Specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (e.g., N-phenylglycine), the organic metal compounds described in JP-B No. 48-42965 (e.g., tributyltin acetate), the hydrogen donors described in JP-B No. 55-34414, the sulfur compounds described in JP-A No. 6-308727 (e.g., trithiane), the phosphorus compounds described in JP-A No. 6-250387 (e.g., diethyl phosphite), and the Si—H and Ge—H compounds described in Japanese Patent Application No. 8-65779.

(G) Other Components

The ink composition according to the invention may further contain other components in accordance with necessity. Examples of such additional components include polymerization inhibitors, solvents, and the like.

A polymerization inhibitor may be added to the ink composition according to the invention for improvement in storability. When the ink composition according to the invention is applied to inkjet recording, it is preferable to heat the composition to a temperature in the range of 40 to 80° C. so as to reduce the viscosity of the ink before ejection; and thus, the addition of a polymerization inhibitor is preferable for the prevention of the head clogging by thermal polymerization. The polymerization inhibitor is preferably added in an amount of 200 to 20,000 ppm with respect to the total amount of the ink composition according to the invention.

Examples of polymerization inhibitors include hydroquinone, benzoquinone, p-methoxyphenol, TEMPO (2,2,6,6-tetramethyl-.piperidine-1-oxyl), TEMPOL (4-Hydroxy-2,2,6,6-tetramethyl-piperidine-1-oxyl), and cupferron AI.

Considering that the ink composition according to the invention is a radiation-curable ink composition, the composition preferably contains no solvent, so that the reaction occurs immediately after deposition to cure the ink composition. The ink composition may contain a predetermined solvent as long as it does not affect the curing speed of ink composition and the like. The solvent may be an organic solvent or water. In particular, an organic solvent may be added for improvement in adhesiveness to the recording medium (support such as paper). Addition of an organic solvent is effective for the prevention of the problem of VOCs. The amount of organic solvent is, for example, in the range of 0.1 to 5% by weight, preferably in the range of 0.1 to 3% by weight, with respect to the total weight of the ink composition according to the invention.

In addition, other known compounds may be added to the ink composition according to the invention in accordance with necessity. Examples of such additional compounds include a surfactant, a leveling additive, a matting agent, and a resin for adjustment of film physical properties, such as a polyester resin, a polyurethane resin, a vinyl resin, an acrylic resin, a rubber resin, or a wax. Further, addition of a tackifier that does not inhibit polymerization is also preferable in view of the improvement in adhesiveness to recording media such as polyolefin or PET. Specific examples thereof include the high-molecular weight adhesive polymers described in JP-A No. 2001-49200, pp. 5 to 6 (e.g., copolymers of a (meth)acrylic ester of an alcohol having an alkyl group having 1 to 20 carbon atoms, copolymers of a (meth)acrylic ester of an alicyclic alcohol having 3 to 14 carbon atoms, and copolymers of a (meth)acrylic ester of an aromatic alcohol having 6 to 14 carbon atoms), and low-molecular weight adhesive resins having polymerizable unsaturated bonds.

Properties of Ink Composition

The ink composition of the invention can be preferably used as an ink for ink jet recording. Preferable properties in such an embodiment is herein explained.

Considering the ejection efficiency when applied to inkjet recording, the ink composition according to the invention preferably has an ink viscosity of 7 to 30 mPa·s, more preferably 7 to 25 mPa·s, at the temperature at the time of ejection (e.g., a temperature in the range of 40 to 80° C., more preferably in the range of 25 to 50° C.). The viscosity at room temperature (25 to 30° C.) of the ink composition may be 35 to 500 mPa·s, preferably 35 to 200 mPa·s.

It is preferable to adjust and determine the composition properly so that the viscosity falls in the range. By setting the viscosity at room temperature high, it become possible to prevent penetration of the ink into the recording medium even when a porous recording medium is used, to reduce the amount of uncured monomer and the odor, to suppress bleeding upon the deposition of ink droplets, and consequently to improve the image quality.

The surface tension of the ink composition according to the invention is preferably from 20 to 30 mN/m and more preferably from 23 to 28 mN/m. When the ink is used for recording on various recording media such as polyolefin, PET, coated paper, and non-coated paper, the surface tension is preferably 20 mN/m or more in view of the prevention of bleeding and penetration, and 30 mN/m or less in view of the wettability.

Inkjet Recording Method

Hereinafter, the inkjet recording method according to the invention and inkjet recording apparatuses applicable thereto will be described.

The inkjet recording method according to the invention comprises ejecting the ink composition as an ink for ink jet recording onto a recording medium such as a support or a recording material and curing the ejected ink composition by irradiation with active radiation rays so as to form an image on the recording medium.

Namely, the inkjet recording method according to the invention comprises (i) ejecting the ink composition of the invention onto a recording medium and (ii) curing the ejected ink composition by irradiation with active radiation rays.

The inkjet recording method of the invention forms an image by curing the ink composition on the recording medium by including at least the above-described (i) and (ii).

The (i) ejecting in the recording method of the invention may utilize the inkjet recording apparatus that is hereinafter explained in detail.

Inkjet Recording Apparatus

The inkjet recording apparatus for use in the invention is not particularly limited, and may be selected from commercially available inkjet recording apparatuses. That is, in the invention, the (i) ejecting of the ink composition on the recording media can be performed by any known inkjet recording apparatuses including commercially available ones.

Examples of usable inkjet recording apparatuses include an apparatus which has at least an ink-supplying system, a temperature sensor, and active radiation source.

The ink-supplying system includes, for example, a stock tank storing the inkjet recording ink according to the invention, a supply pipe, an ink-supplying tank immediately before inkjet head, a filter, and a piezoelectric inkjet head. The piezoelectric inkjet head can be operated such that the ejection is conducted at a resolution in a range of, for example, 320×320 to 4,000×4,000 dpi, preferably in a range of 400×400 to 1,600×1,600 dpi, and more preferably in a range of 720×720 dpi, to form multi-sized dots in an amount in a range of 1 to 100 pl, which is preferably in a range of 8 to 30 pl. The unit "dpi" in the invention means the number of dots per 2.54 cm.

As described above, the temperature of the radiation-curable ink at the time of ejection is preferably maintained constant. Therefore, the region from the ink-supplying tank to the inkjet head is preferably thermally insulated and heated. The method of controlling the temperature is not particularly limited. In an embodiment, each piping unit is monitored by multiple temperature sensors and is heated to control the temperature adequately based on the flow rate of ink and the environmental temperature. The temperature sensors may be disposed in the ink-supplying tank and near the nozzles of the inkjet head. In addition, the head unit to be heated is preferably thermally shielded or insulated so as to minimize the environmental influence on the apparatus. It is preferable to insulate the head unit from other units and reduce the heat capacity of the entire unit to be heated in order to shorten the start-up time needed for heating or in order to reduce the loss in heat energy.

When the ink composition or inkjet recording ink composition according to the invention is ejected onto the surface of the hydrophilic support, it is preferable to decrease the viscosity of the ink composition to 7 to 30 mPa·s (more preferably 7 to 20 mPa·s) by heating the ink composition to 40 to 80° C. (more preferably 25 to 50° C.) before ejection. The use of an ink composition whose ink viscosity at 25° C. is in the range of 35 to 500 mP·s is preferable since significant effects are obtained. In this manner, it is possible to realize highly stable ejection.

Generally, radiation-curable ink compositions, such as the ink composition according to the invention, are usually more viscous than aqueous inks, and the fluctuation in the viscosity of radiation-curable ink compositions caused by the fluctuation in temperature during printing is larger. The fluctuation in the viscosity of ink composition exerts significant influences on the droplet size and the droplet ejection speed, causing deterioration in image quality, and thus, it is necessary to keep the temperature of the ink composition as constant as possible during printing. It is preferable to control the ink composition temperature within ±5° C. from the set temperature, more preferably ±2° C. from the set temperature, and still more preferably ±1° C. from the set temperature.

The (ii) curing the ejected ink composition by irradiation with active radiation rays in the recording method of the invention is hereinafter explained.

The ink composition ejected on the surface of a recording medium is cured by irradiation with active radiation. This is because the (A) polymerization initiator contained in the ink composition according to the invention is decomposed by irradiation of active radiation so as to generate a polymerization starter such as a radical, an acid or a base, and the function of the polymerization starter is exhibited so as to cause and promote radical polymerization of the (B) or (B') specific polymerizable compound, which may further be copolymerized with the (C) other additional polymerizable compound which are used in combination in accordance with necessity. In a case where an (E) sensitizing dye coexists with the (A) polymerization initiator, the (E) sensitizing dye is excited to the excited state by absorption of active radiation, and then the (A) polymerization initiator in the polymerization initiation system is promoted to decomposing upon contact with the (E) sensitizing dye in the excited state, so as to achieve curing of the ink composition with high sensitivity.

Examples of the active radiation include α-rays, γ-rays, electron beams, X-rays, ultraviolet rays, visible rays, and infrared rays. The peak wavelength of the active radiation depends on the absorption characteristics of the sensitizing dye in the ink composition, and it may be, for example, in a range of 200 to 600 nm, preferably in a range of 300 to 450 nm, and more preferably in a range of 350 to 420 nm.

A polymerization initiating system provided in the invention is sufficiently sensitive to radiation even at a low output. Accordingly, output of the radiation may be, for example, an irradiation energy of 2,000 mJ/cm2 or lower, preferably from 10 to 2,000 mJ/cm2, more preferably from 20 to 1,000 mJ/cm2, and still more preferably from 50 to 800 mJ/cm2.

The active radiation may be irradiated such that the illuminance on the exposure plane is, for example, in a range of 10 to 2,000 mW/cm2, and preferably in a range of 20 to 1,000 mW/cm2.

Mercury lamps, gas or solid state lasers and the like are widely used as active radiation ray sources, and mercury lamps and metal halide lamps are widely used for UV-curing inkjet. However, under the current strong needs for the elimination of the use of mercury from the viewpoint of environmental protection, it is very important industrially and environmentally to replace mercury lamps with GaN-type semiconductor UV-emitting devices. In addition, LED's (UV-LED) and LD's (UV-LD) are smaller in size, longer in lifetime, higher in efficiency, and lower in cost, and thus, attracting attention as light sources for radiation-curing inkjet printers.

As described above, a light-emitting diode (LED) or a laser diode (LD) may be used as the active radiation ray source. An ultraviolet LED or an ultraviolet LD may be used when an ultraviolet ray source is required. For example, a purple LED having a main emission spectrum in the wavelength range of 365 to 420 nm is available from Nichia Corporation. As to a light having a still shorter wavelength, U.S. Pat. No. 6,084,250 (the disclosure of which is incorporated herein by reference) discloses an LED having a main emission spectrum in the wavelength region of 300 to 370 nm. Other ultraviolet LED's are also commercially available, and capable of emitting radiations of different UV ranges. The radiation ray source used in the invention is preferably a UV-LED, and particularly preferably a UV-LED having a peak wavelength in the range of 350 to 420 nm.

The maximum illuminance of LED light on the image recording medium is preferably from 10 to 2000 mW/cm2, more preferably from 20 to 1000 mW/cm2, and still more preferably from 50 to 800 mW/cm2.

The ink composition according to the invention may be irradiated with active radiation rays, for example, for 0.01 to 120 seconds, preferably for 0.1 to 90 seconds.

The irradiation condition and the basic irradiation method with the active radiation are disclosed in JP-A No. 60-132767. Specifically, the exposure is performed in a so-called shuttle process, i.e., by scanning with a head unit having an ink-ejecting device and light sources disposed at both sides of the head unit. The active radiation is irradiated a certain period (e.g., from 0.01 to 0.5 second, preferably from 0.01 to 0.3 second, and more preferably, from 0.01 to 0.15 second) after ink deposition. When the time between ink deposition and irradiation is very short, it is possible to prevent bleeding of the uncured ink deposited on the recording medium. Further, even when a porous recording medium is used, ink is exposed to radiation before penetrating deep into the recording medium where the radiation does not reach, whereby residual unreacted monomer is reduced to reduce odor.

The curing of the ink may be conducted with a light source that is not driven. WO 99/54415 Pamphlet discloses an irradiation method in which the recording area is irradiated with UV rays by using an optical fiber or by using a mirror disposed on a side wall of the head unit which mirror reflects the collimated light. Such curing methods may also be applied in the inkjet recording method of the invention.

By employing inkjet-recording methods such as described above, the dot diameter of the deposited ink can be maintained constant even when various recording media that are different in surface wettability is used, thus improving the image quality. In order to obtain a color image by the inkjet recording method according to the invention, it is preferable to form images by in an order in which a color having higher lightness overcoats another color(s) having lower lightness. When color inks are applied in that order, the radiation rays reaches inks located at the bottom; therefore, superior curing sensitivity, reduction in the amount of residual monomer and odor, and improvement in adhesiveness are achieved. Although it is possible to conduct the irradiation with radiation after a full-color image is formed, it is preferable to irradiate the image with radiation after each color ink is deposited, in view of the acceleration of curing.

As described above, the ink composition according to the invention is cured by irradiation with active radiation, whereby a hydrophobic image is formed on the hydrophilic surface of the support.

Method of Producing a Planographic Printing Plate

The planographic printing plate of the invention may be formed by a method which comprises ejecting the ink composition according to the invention onto a hydrophilic support and curing the ink composition.

Hereinafter, a method for forming a planographic printing plate using the inkjet recording method of the invention (namely, the method for forming a planographic printing plate of the invention), and a planographic printing plate obtained thereby (namely, the planographic printing plate of the invention) are explained.

The planographic printing plate according to the invention has a hydrophilic support and a hydrophobic region formed on the hydrophilic support.

The method for forming the planographic printing plate is characterized by having at least the following (I) and (II):

(I) ejecting the ink composition according to the invention onto a hydrophilic support; and (II) curing the ink composition by irradiating the ejected ink composition with radiation so as to form a hydrophobic image on the hydrophilic support.

The planographic printing plate of the invention can be formed in a similar manner as the inkjet recording method of the invention except that a support having a hydrophilic surface so as to be preferable as a support for planographic printing plate is used in place of the recording medium.

Planographic printing plates have been conventionally manufactured by, as described above, imagewisely exposing so-called PS plates, in which a lipophilic photosensitive resin layer is provided on a hydrophilic support, and solubilizing or curing the thus obtained exposed portions so as to form image portions and removing non-image portions by dissolving.

In contrast, in the method for forming the planographic printing plate of the invention, the application of the inkjet recording method enables to form a hydrophobic image portion by directly ejecting the ink composition in accordance with digitalized image information and curing the ink composition. By applying such configuration, the method for forming the planographic printing plate of the invention enables to form a planographic printing plate in a easier manner than conventionally-known methods for forming a planographic printing plate.

The planographic printing plate of the invention comprises a hydrophilic support and a hydrophobic image which is formed by the ink composition of the invention and is provided on a surface of the hydrophilic support.

The hydrophilic support for use in the preparation of the planographic printing plate according to the invention is not particularly limited as long as it is a dimensionally stable plate-shaped support. A support whose surface has hydrophilicity may be used as the support of the planographic printing plate in consideration of image quality of printed matter obtained thereby.

In a case where a material for forming the support has hydrophilicity, the material can be directly used as it is. In a case where a material for forming the support does not have hydrophilicity, the material can be subjected to hydrophilization treatment.

Examples of the material for the support include paper, paper laminated with a plastic material (e.g., polyethylene, polypropylene, or polystyrene), metal plates (e.g., plates formed of aluminum, zinc, or copper), plastic films (e.g., films formed of cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinylacetal), paper or plastic films laminated with a metal selected from the above metals, and paper or plastic films on which a metal selected from the above metals are deposited. Preferable examples of the support include polyester films and aluminum plates. Among them, aluminum plates, which are superior in dimensional stability and have relatively low price, are more preferable.

When the support is an aluminum plate, the aluminum plate may be a pure aluminum plate, an alloy plate containing aluminum as the main component and trace amounts of hetero-elements, or a thin film of aluminum or an aluminum alloy laminated with plastic. Examples of the hetero-element contained in the aluminum alloy include silicon, iron, manganese, copper, magnesium, chromium, zinc, bismuth, nickel, and titanium. The content of the hetero-elements in the alloy is preferably 10% by weight or less. Although pure aluminum plates are preferable in the invention, aluminum plates containing trace amounts of hetero-elements are also usable because it is difficult to prepare completely pure aluminum due to the problems in refining process. The composition of the aluminum plate is not particularly limited, and may be selected from known or commonly-used raw materials.

The thickness of the support is preferably in a range of 0.1 to 0.6 mm and more preferably in a range of 0.15 to 0.4 mm.

The aluminum plate is preferably subjected to a surface treatment such as a surface-roughening treatment or an anodizing treatment before use. The hydrophilicity of the support and the adhesion between the image-recording layer and the support are improved by the surface finishing. Before the surface-roughening treatment, the aluminum plate may be subjected to a degreasing treatment, for example, with a surfactant, organic solvent, aqueous alkaline solution, or the like so as to remove the rolling oil on the surface.

Various methods may be used for surface roughening of aluminum plate, and examples thereof include a mechanical surface-roughening treatment, an electrochemical surface-roughening treatment (surface-roughening by electrochemically dissolving the surface), and a chemical surface-roughening treatment (surface-roughening by chemically dissolving the surface).

The method for the mechanical surface-roughening may be selected from methods known in the art such as ball polishing, brush polishing, blast polishing, and buff polishing may be used. A transfer method may also be used in which the surface irregularity is imprinted by a roll having a rough surface during hot rolling of aluminum.

The electrochemical surface roughening may be performed, for example, by applying an alternate or direct current to the support in an electrolyte solution containing an acid such as hydrochloric acid or nitric acid. A method of using a mixed acid is also usable, such as described in JP-A No. 54-63902, the disclosure of which is incorporated herein by reference.

In accordance with necessity, the aluminum plate after surface-roughening treatment may be further etched with alkali using an aqueous solution of potassium hydroxide, sodium hydroxide, or the like. In accordance with necessity, the etched aluminum plate may be further neutralized, and the neutralized aluminum plate may be further subjected to anodizing so as to improve the abrasion resistance.

The electrolyte to be used for the anodization of the aluminum plate may be selected from various electrolytes as long as the electrolyte is capable of forming a porous oxide film. Generally, the electrolyte may be selected from sulfuric acid, hydrochloric acid, oxalic acid, chromic acid, and mixed acids thereof. The concentration of the electrolyte is determined adequately according to the kind of the electrolyte.

While the condition of the anodization may be changed according to the electrolyte to be used, and thus cannot be uniformly specified, in general, the electrolyte concentration may be in a range of 1 to 80% by weight; the liquid temperature may be in a range of 5 to 70° C., the electric current density may be in a range of 5 to 60 A/dm2; the voltage may be in a range of 1 to 100 V; and the electrolysis time may be in a range of 10 seconds to 5 minutes. The amount of the anodic oxide film to be formed is preferably in a range of 1.0 to 5.0 g/m2 and more preferably in a range of 1.5 to 4.0 g/m2. In this range, it is possible to obtain a planographic printing plate with superior printing durability and scratch resistance of the non-image area.

The support which has been subjected to a surface treatment such as described above and which has an anodic oxide film may be used, without further treatments, as the support to be used in the invention. Alternatively, the support may be further subjected to other treatments in accordance with necessity, such as a treatment for expanding or sealing the micropores in the anodic oxide film described in JP-A Nos. 2001-253181 or 2001-322365 (the disclosures of which are incorporated herein by reference) and a treatment for imparting hydrophilicity to the support surface comprising immersing the support in an aqueous solution containing a hydrophilic compound, so as to further improve the adhesion of the support to the hydrophobic image, hydrophilicity, stain-resistance, and the like of the support. The treatments for expanding or sealing are not limited to those described above, and may be conducted by any conventionally known methods.

Sealing

The sealing may be conducted by vapor sealing, sealing only with fluorozirconic acid, sealing with an aqueous solution containing an inorganic fluorine compound such as sodium fluoride, sealing with water vapor provided with lithium chloride, or sealing with hot water.

Among the methods above, sealing with an aqueous solution containing an inorganic fluorine compound, sealing with water vapor, and hot-water sealing are preferable.

Sealing with Aqueous Solution Containing Inorganic Fluorine Compound

Preferable examples of the inorganic fluorine compound used for the sealing with an aqueous solution containing the inorganic fluorine compound include a metal fluoride.

Specific examples thereof include sodium fluoride, potassium fluoride, calcium fluoride, magnesium fluoride, sodium fluorozirconate, potassium fluorozirconate, sodium fluorotitanate, potassium fluorotitanate, ammonium fluorozirconate, ammonium fluorotitanate, fluorozirconic acid, fluorotitanic acid, hexafluorosilicic acid, nickel fluoride, iron fluoride, fluorophosphoric acid and ammonium fluorophosphate. Preferable among these compounds are sodium fluorozirconate, sodium fluorotitanate, fluorozirconic acid, and fluorotitanic acid.

The concentration of the inorganic fluorine compound in the aqueous solution is preferably 0.01% by weight or higher, more preferably 0.05% by weight or higher, in respect of sufficient sealing of micropores in the anodized film. The concentration of the inorganic fluorine compound in the aqueous solution is preferably 1% by weight or lower, more preferably 0.5% by weight or lower, in respect of stain resistance.

The aqueous solution containing an inorganic fluorine compound preferably further contains a phosphate compound. When the phosphate compound is contained in the aqueous solution, the hydrophilicity of the surface of the anodized film is improved thus improving on-press developability and stain resistance.

The phosphate compound is preferably selected from metal phosphates such as phosphates of alkali metals and phosphates of alkaline earth metals.

Specific examples thereof include zinc phosphate, aluminum phosphate, ammonium phosphate, diammonium hydrogenphosphate, ammonium dihydrogenphosphate, monoammonium phosphate, monopotassium phosphate, monosodium phosphate, potassium dihydrogenphosphate, dipotassium hydrogenphosphate, calcium phosphate, sodium ammonium hydrogenphosphate, magnesium hydrogenphosphate, magnesium phosphate, ferrous phosphate, ferric phosphate, sodium dihydrogenphosphate, sodium phosphate, disodium hydrogenphosphate, lead phosphate, diammonium phosphate, calcium dihydrogenphosphate, lithium phosphate, phosphotungstic acid, ammonium phosphotungstate, sodium phosphotungstate, ammonium phosphomolybdate, sodium phosphomolybdate, sodium phosphite, sodium tripolyphosphate and sodium pyrophosphate. Among these, sodium dihydrogenphosphate, disodium hydrogenphosphate, potassium dihydrogenphosphate and dipotassium hydrogenphosphate are preferable.

The combination of the inorganic fluorine compound and the phosphate compound is not particularly limited. In a preferable embodiment, the aqueous solution contains sodium fluorozirconate as the inorganic fluorine compound and sodium dihydrogenphosphate as the phosphate compound.

The concentration of the phosphate compound in the aqueous solution is preferably 0.01% by weight or higher, more preferably 0.1% by weight or higher, from the viewpoint of improving on-press developability and stain resistance. The concentration of the phosphate compound in the aqueous solution is preferably 20% by weight or lower, more preferably 5% by weight or lower, in respect of the solubility.

The ratios of the respective compounds in the aqueous solution are not particularly limited. The ratio by mass of the inorganic fluorine compound to the phosphate compound is preferably in the range of 1/200 to 10/1, more preferably in the range of 1/30 to 2/1.

The temperature of the aqueous solution is preferably 20° C. or higher, more preferably 40° C. or higher, but preferably 100° C. or lower, more preferably 80° C. or lower.

The pH of the aqueous solution is preferably 1 or higher, more preferably 2 or higher, while it is preferably 11 or lower, more preferably 5 or lower.

The method of sealing with the aqueous solution containing an inorganic fluorine compound is not particularly limited, and examples thereof include a dipping method and a spraying method. The method of sealing may be utilized once or twice or more times, and two or more kinds of the sealing treatments may be conducted in combination.

Among the above, the dipping method is preferable for conducting the sealing. When the dipping method is used in the sealing, a time length for the sealing is preferably at least 1 second, and more preferably at least 3 seconds, while it is preferably 100 seconds or shorter, and more preferably 20 seconds or shorter.

Sealing with Water Vapor

The sealing using water vapor may be conducted by, for example, allowing the anodized film to continuously or intermittently contact with pressurized water vapor or water vapor of atmospheric pressure.

The temperature of the water vapor is preferably 80° C. or higher, more preferably 95° C. or higher, but preferably 105° C. or lower.

The pressure of the water vapor is preferably in the range of from (atmospheric pressure−50 mmAq) to (atmospheric pressure+300 mmAq). In an embodiment, the pressure of the water vapor is preferably in the range of $1.008 \times 10^5$ to $1.043 \times 10^5$ Pa.

The duration of the contact with water-vapor is preferably 1 second or longer, more preferably 3 seconds or longer, while it is preferably 100 seconds or shorter, more preferably 20 seconds or shorter.

Sealing with Hot Water

The sealing using hot water may be conducted, for example by dipping an aluminum plate having an anodized film formed thereon in hot water. The hot water may contain an inorganic salt (for example, a phosphate) or an organic salt.

The temperature of the hot water is preferably 80° C. or higher, more preferably 95° C. or higher, while it is preferably 100° C. or lower.

The dipping time is preferably 1 second or longer, more preferably 3 seconds or longer, while it is preferably 100 seconds or shorter, more preferably 20 seconds or shorter.

Examples of methods for imparting hydrophilicity usable in the present invention include: alkali metal silicate methods such as disclosed in U.S. Pat. Nos. 2,714,066, 3,181,461, 3,280,734, and 3,902,734 (the disclosures of which are incorporated herein by reference), the methods comprising immersing or electrolyzing the support in an aqueous solution of sodium silicate or the like; a method disclosed in JP-B No. 36-22063 (the disclosure of which is incorporated herein by reference), the method comprising treating the support with potassium fluorozirconate; and methods such as disclosed in U.S. Pat. Nos. 3,276,868, 4,153,461, and 4,689,272 (the disclosures of which are incorporated herein by reference), the methods comprising treating the support with polyvinyl phosphonic acid.

The support according to the invention preferably has an average center-line roughness of 0.10 to 1.2 µm. In the range above, desirable adhesiveness to the hydrophobic image, favorable printing durability, and favorable staining resistance are realized.

(I) Ejecting Ink Composition of the Invention onto Hydrophilic Support

In the method for forming the planographic printing plate of the invention, the ink composition of the invention is firstly ejected onto a hydrophilic support. Similarly to the (i) ejecting of the ink composition of the invention in the inkjet recording method of the invention, the method for forming the planographic printing plate of the invention may be performed by using a conventionally-known inkjet recording apparatus. The range of the temperature of the ink, the range of the viscosity of the ink, and the methods for controlling these for ejecting the ink using the inkjet recording apparatus in the method for forming the planographic printing plate of the invention are also similar to those of the (i) ejecting of the ink composition in the inkjet recording method of the invention. The ejected amount and the size of the ejected droplet are selected so as to be suitable to printed products to be formed.

(II) Curing Ink Composition by Irradiating Ejected Ink Composition with Radiation so as to Form Hydrophobic Image The ink composition ejected onto a surface of the hydrophilic support is cured by irradiation with active radiation ray. Details of the curing system of the ink composition are similar to that in the (ii) curing of the ejected ink composition of the invention in the inkjet recording method of the invention. The source of the active radiation ray and preferable irradiating condition in the method for forming the planographic printing plate of the invention are also similar to those of the (ii) curing of the ejected ink composition of the invention in the inkjet recording method of the invention.

The planographic printing plate of the invention can be obtained via the ejecting and curing so as to form, onto a surface of a hydrophilic support, a hydrophobic image formed by curing the ink composition of the invention.

As described above, by manufacturing a planographic printing plate by applying the inkjet recording method according to the invention, a dot diameter of the ink landed on the support can be maintained constant, even when various kinds of supports for planographic printing plates which are different in surface wettability from one another, and as a result thereof, hydrophobic images can be formed with a good precision.

Further, as described above, the ink composition according to the invention is cured with active radiation ray with a high sensitivity and can form a hydrophobic region (hydrophobic image) excellent in adhesion to the support and the quality of the resultant film.

From these features, the planographic printing plate according to the invention provides high image quality and excellent print durability.

Further, as it would be understood by those skilled in the art, the ink composition according to the invention can be effectively used not only for forming an image portion of the planographic printing plate but also as an ink composition which can be generally used for preparation of a printed matter and the like as described above.

EXAMPLES

Hereinafter, the present invention is described in detail with reference to embodiments, while the present invention is by no means limited thereby.

The embodiments described below relate to each of plural colors of inks for UV inkjet.

Example 1

Components described below were mixed with a high-speed water-cooled mixer, to thereby obtain a cyan ink for UV inkjet.

Cyan Ink Composition

| | |
|---|---|
| Specific polymerizable compound [exemplary compound (B-2): corresponding to the (B) component] | 21.0 parts |
| Lauryl acrylate (trade name: NK ESTER LA, manufactured by Shin-Nakamura Chemical Co., Ltd.) | 10.0 parts |
| Acrylate monomer (trade name: ACTILANE 421*, manufactured by Akcros Chemicals: corresponding to the (D) component) | 26.0 parts |
| UV thinner (trade name: PHOTOMER 2017, manufactured by E Chem: corresponding to the (D) component) | 12.4 parts |

-continued

| | |
|---|---|
| Dispersant (trade name: SOLSPERSE 32000, manufactured by Noveon, Inc.) | 0.4 parts |
| Pigment (trade name: IRGALITE BLUE GLVO, manufactured by Ciba Specialty Chemicals: corresponding to the (C) component) | 3.6 parts |
| Stabilizer (trade name: GENORAD 16, manufactured by Rahn) | 0.05 parts |
| Vinyl ether (trade name: RAPI-CURE DVE-3, manufactured by ISP Europe: corresponding to the (D) component) | 10.0 parts |
| Photopolymerization initiator (trade name: LUCIRIN TPO, manufactured by BASF: corresponding to the (A) component) | 8.5 parts |
| Photopolymerization initiator (benzophenone: corresponding to the (A) component) | 4.0 parts |
| Photopolymerization initiator (trade name: IRGACURE 184, manufactured by Ciba Specialty Chemicals: corresponding to the (A) component) | 4.0 parts |
| Defoamer (trade name: BYK 307, manufactured by BYK Chemie) | 0.05 parts |

*ACTILANE 421 is propoxylated neopentyl glycol diacrylate (difunctional acrylate).

Evaluation of Ink

The thus-obtained cyan ink composition was printed on a sheet made of polyvinyl chloride and exposed to irradiation by passing under a ray emitted from an ultraviolet lamp (power: 120 W/cm) which was subjected to an iron-doping treatment at a speed of 40 m/mim. The resulted printed matter prepared with this ink was evaluated as follows.

(1) Evaluation of Sensitivity for Curing

Energy of exposure required for curing the ink composition was measured by a photo-amount integrating meter (trade name: UV POWERMAP™, manufactured by EIT Inc.). As a value measured thereby is smaller, the ink composition is evaluated as higher in sensitivity for curing.

As a result of the above measuring, the ink composition of Example 1 was observed to require an integrated amount of UV exposure is about 330 mJ/cm$^2$, thus it was confirmed that the ink composition of Example 1 is cured with high sensitivity.

(2) Evaluation of Curability

A curability of the ink composition was evaluated by physically touching an image portion formed after curing the ink composition of the printed matter. Specifically, the curability is defined by the existence of adhesiveness on a surface of a cured film of the image portion.

As a result of the above evaluation, the ink composition of Example 1 was observed as completely losing adhesiveness, thus it was confirmed that the ink composition of Example 1 is excellent in curability.

(3) Evaluation of Adhesiveness to Recording Material

An adhesiveness of the ink composition to a recording material was evaluated by a cross hatch test in accordance with ISO 2409 (ASTM D 3359). The cross hatch test was conducted so that the cured film of the printed matter was cut at an interval of 2.0 mm to give 6 lines in each of the vertical direction and the horizontal direction so that 25 squares were formed. An adhesive tape (SCOTCH® 3M600, manufactured by 3M) was adhered with strength onto the printing faces and rapidly peeled off. Whether the printed image is peeled off or remaining without being peeled was evaluated according to the notation of 5B to 1B of the ASTM method. "5B" is the grade for being evaluated as having most excellent adhesiveness, while "3B" or higher grades are evaluated as having no practical problem.

As a result of the above evaluation, the ink composition of Example 1 was observed as having high adhesiveness, and the grade thereof in the notation of the ASTM method was classified as 4B.

(4) Evaluation of Flexibility

An image was formed on a sheet by the ink composition, and after the sheet was bended for ten times, a flexibility of the ink composition was evaluated by observing a degree of cracks generated in a film of the cured image. The result of the bending test is classified into one of five grades, in which "5 points" is the grade for being evaluated as having no crack, while "3 points" or higher grades are evaluated as having no practical problem.

As a result of the above evaluation, the ink composition of Example 1 was observed as having only a slight crack which does not affect the printed image, and the grade thereof in the above criteria was classified as 3 points.

Example 2

Components described below were mixed with a high-speed water-cooled mixer, to thereby obtain a magenta ink for UV inkjet.

Magenta Ink Composition

| | |
|---|---|
| Specific polymerizable compound [exemplary compound (B-3): corresponding to the (B) component] | 14.0 parts |
| Lauryl acrylate (trade name: NK ESTER LA, manufactured by Shin-Nakamura Chemical Co., Ltd.) | 6.0 parts |
| Acrylate monomer (trade name: ACTILANE 421*, manufactured by Akcros Chemicals: corresponding to the (D) component) | 35.4 parts |
| UV thinner (trade name: PHOTOMER 2017, manufactured by E Chem: corresponding to the (D) component) | 16.0 parts |
| Dispersant (trade name: SOLSPERSE 32000, manufactured by Noveon, Inc.) | 0.4 parts |
| Pigment (trade name: CINQUASIA MAZENTA RT-355D, manufactured by Ciba Specialty Chemicals: corresponding to the (C) component) | 3.6 parts |
| Stabilizer (trade name: GENORAD 16, manufactured by Rahn) | 0.05 parts |
| Vinyl ether (trade name: RAPI-CURE DVE-3, manufactured by ISP Europe: corresponding to the (D) component) | 8.0 parts |

| | |
|---|---|
| Photopolymerization initiator (trade name: LUCIRIN TPO, manufactured by BASF: corresponding to the (A) component) | 8.5 parts |
| Photopolymerization initiator (benzophenone: corresponding to the (A) component) | 4.0 parts |
| Photopolymerization initiator (trade name: IRGACURE 184, manufactured by Ciba Specialty Chemicals: corresponding to the (A) component) | 4.0 parts |
| Defoamer (trade name: BYK 307, manufactured by BYK Chemie) | 0.05 parts |

The thus-obtained magenta ink composition was printed on a sheet made of polyvinyl chloride and exposed to irradiation by passing under a ray emitted from an ultraviolet lamp (power: 120 W/cm) which was subjected to an iron-doping treatment at a speed of 40 m/mim. The resulted printed matter prepared with this ink was evaluated in a similar manner as for Example 1. The results thereof are shown in the following Table 1.

Example 3

Components described below were mixed with a high-speed water-cooled mixer, to thereby obtain a yellow ink for UV inkjet.

Yellow Ink Composition

| | |
|---|---|
| Specific polymerizable compound [exemplary compound (B-2): corresponding to the (B) component] | 12.0 parts |
| Lauryl acrylate (trade name: NK ESTER LA, manufactured by Shin-Nakamura Chemical Co., Ltd.) | 8.0 parts |
| Acrylate monomer (trade name: ACTILANE 421*, manufactured by Akcros Chemicals: corresponding to the (D) component) | 36.4 parts |
| UV thinner (trade name: PHOTOMER 2017, manufactured by E Chem: corresponding to the (D) component) | 17.0 parts |
| Dispersant (trade name: SOLSPERSE 32000, manufactured by Noveon, Inc.) | 0.4 parts |
| Pigment (trade name: CROMOPHTAL YELLOW LA, manufactured by Ciba Specialty Chemicals: corresponding to the (C) component] | 3.6 parts |
| Stabilizer (trade name: GENORAD 16, manufactured by Rahn) | 0.05 parts |
| Vinyl ether (trade name: RAPI-CURE DVE-3, manufactured by ISP Europe: corresponding to the (D) component) | 6.0 parts |
| Photopolymerization initiator (trade name: LUCIRIN TPO, manufactured by BASF: corresponding to the (A) component) | 8.5 parts |
| Photopolymerization initiator (benzophenone: corresponding to the (A) component) | 4.0 parts |
| Photopolymerization initiator (trade name: IRGACURE 184, manufactured by Ciba Specialty Chemicals: corresponding to the (A) component) | 4.0 parts |
| Defoamer (trade name: BYK 307, manufactured by BYK Chemie) | 0.05 parts |

The thus-obtained yellow ink composition was printed on a sheet made of polyvinyl chloride and exposed to irradiation by passing under a ray emitted from an ultraviolet lamp (power: 120 W/cm) which was subjected to an iron-doping treatment at a speed of 40 m/mim. The resulted printed matter prepared with this ink was evaluated in a similar manner as for Example 1. The results thereof are shown in the following Table 1.

Example 4

Components described below were mixed with a high-speed water-cooled mixer, to thereby obtain a black ink for UV inkjet.

Black Ink Composition

| | |
|---|---|
| Specific polymerizable compound [exemplary compound (B-2): corresponding to the (B) component] | 34.0 parts |

| | |
|---|---|
| Long-chain alkyl acrylate mixture (having 8 to 10 carbon atoms) | 2.0 parts |
| Acrylate monomer (trade name: ACTILANE 421*, manufactured by Akcros Chemicals: corresponding to the (D) component) | 21.4 parts |
| UV thinner (trade name: PHOTOMER 2017, manufactured by E Chem: corresponding to the (D) component) | 16.0 parts |
| Dispersant (trade name: SOLSPERSE 32000, manufactured by Noveon, Inc.) | 0.4 parts |
| Pigment (trade name: MICROLITH BLACK C-K, manufactured by Ciba Specialty Chemicals: corresponding to the (C) component) | 2.6 parts |
| Stabilizer (trade name: GENORAD 16, manufactured by Rahn) | 0.05 parts |
| Vinyl ether (trade name: RAPI-CURE DVE-3, manufactured by ISP Europe: corresponding to the (D) component) | 7.0 parts |
| Photopolymerization initiator (trade name: LUCIRIN TPO, manufactured by BASF: corresponding to the (A) component) | 8.5 parts |
| Photopolymerization initiator (benzophenone: corresponding to the (A) component) | 4.0 parts |
| Photopolymerization initiator (trade name: IRGACURE 184, manufactured by Ciba Specialty Chemicals: corresponding to the (A) component) | 4.0 parts |
| Defoamer (trade name: BYK 307, manufactured by BYK Chemie) | .05 parts |

The thus-obtained black ink composition was printed on a sheet made of polyvinyl chloride and exposed to irradiation by passing under a ray emitted from an ultraviolet lamp (power: 120 W/cm) which was subjected to an iron-doping treatment at a speed of 40 m/mim. The resulted printed matter prepared with this ink was evaluated in a similar manner as for Example 1. The results thereof are shown in the following Table 1.

Example 5

Components described below were mixed with a high-speed water-cooled mixer, to thereby obtain a cyan ink for UV inkjet.

Cyan Ink Composition

| | |
|---|---|
| Specific polymerizable compound [exemplary compound (B-2): corresponding to the (B) component] | 32.0 parts |
| Acrylate monomer (trade name: ACTILANE 422**, manufactured by Akcros Chemicals: corresponding to the (D) component) | 44.4 parts |
| Dispersant (trade name: SOLSPERSE 32000, manufactured by Noveon, Inc.) | 0.4 parts |
| Pigment (trade name: IRGALITE BLUE GLVO, manufactured by Ciba Specialty Chemicals: corresponding to the (C) component) | 3.6 parts |
| Stabilizer (trade name: GENORAD 16, manufactured by Rahn) | 0.05 parts |
| Vinyl ether (trade name: RAPI-CURE DVE-3, manufactured by ISP Europe: corresponding to the (D) component) | 5.0 parts |
| Photopolymerization initiator (trade name: LUCIRIN TPO, manufactured by BASF: corresponding to the (A) component) | 8.5 parts |
| Photopolymerization initiator (benzophenone: corresponding to the (A) component) | 4.0 parts |
| Photopolymerization initiator (trade name: IRGACURE 184, manufactured by Ciba Specialty Chemicals: corresponding to the (A) component) | 4.0 parts |
| Defoamer (trade name: BYK 307, manufactured by BYK Chemie) | 0.05 parts |

**Actilane 422 is dipropylene glycol diacrylate (difunctional acrylate).

The thus-obtained cyan ink composition was printed on a sheet made of polyvinyl chloride and exposed to irradiation by passing under a ray emitted from an ultraviolet lamp (power: 120 W/cm) which was subjected to an iron-doping treatment at a speed of 40 m/mim. The resulted printed matter prepared with this ink was evaluated in a similar manner as for Example 1. The results thereof are shown in the following Table 1.

Example 6

Components described below were mixed with a high-speed water-cooled mixer, to thereby obtain a cyan ink for UV inkjet.

Cyan Ink Composition

| | |
|---|---:|
| Specific polymerizable compound [exemplary compound (B-3): corresponding to the (B) component] | 30.0 parts |
| Specific polymerizable compound [exemplary compound (B-14): corresponding to the (B) component] | 3.0 parts |
| Acrylate monomer (trade name: KAYARAD HDDA***, manufactured by Nippon Kayaku Co., Ltd.: corresponding to the (D) component) | 12.6 parts |
| Acrylate monomer (trade name: ACTILANE 421, manufactured by Akcros Chemicals: corresponding to the (D) component) | 37.0 parts |
| Dispersant (trade name: SOLSPERSE 32000, manufactured by Noveon, Inc.) | 0.4 part |
| Dispersant (trade name: SOLSPERSE 5000, manufactured by Noveon, Inc.) | 0.05 parts |
| Pigment (trade name: IRGALITE BLUE GLVO, manufactured by Ciba Specialty Chemicals: corresponding to the (C) component) | 1.4 parts |
| Stabilizer (trade name: GENORAD 16, manufactured by Rahn) | 0.05 parts |
| Vinyl ether (trade name: RAPI-CURE DVE-3, manufactured by ISP Europe: corresponding to the (D) component) | 5.0 parts |
| Photopolymerization initiator (trade name: LUCIRIN TPO, manufactured by BASF: corresponding to the (A) component) | 8.0 parts |
| Photopolymerization initiator (benzophenone: corresponding to the (A) component) | 2.0 parts |
| Photopolymerization initiator (trade name: IRGACURE 184, manufactured by Ciba Specialty Chemicals: corresponding to the (A) component) | 4.0 parts |
| Defoamer (trade name: BYK 307, manufactured by BYK Chemie) | 0.05 parts |

***KAYAHARD HDDA is 6-hexanediol diacrylate (difunctional acrylate).

The thus-obtained cyan ink was printed on a sheet made of polyvinyl chloride and, then, exposed to irradiation by passing under a ray emitted from an ultraviolet lamp (power: 120 W/cm) subjected to an iron-doping treatment at a rate of 40 m/mim. The resultant printed matter prepared with this ink was evaluated in a same manner as in Example 1. The results thereof are shown in the following Table 1.

Comparative Example 1

Components described below were mixed with a high-speed water-cooled mixer, to thereby obtain a cyan ink for UV inkjet.

Cyan Ink Composition

| | |
|---|---:|
| Lauryl acrylate (trade name: NK ESTER LA, manufactured by Shin-Nakamura Chemical Co., Ltd.) | 10.0 parts |
| Acrylate monomer (trade name: ACTILANE 421*, manufactured by Akcros Chemicals: corresponding to the (D) component) | 47.0 parts |
| UV thinner (trade name: PHOTOMER 2017, manufactured by E Chem: corresponding to the (D) component) | 12.4 parts |
| Dispersant (trade name: SOLSPERSE 32000, manufactured by Noveon, Inc.) | 0.4 parts |
| Pigment (trade name: IRGALITE BLUE GLVO, manufactured by Ciba Specialty Chemicals: corresponding to the (C) component) | 3.6 parts |
| Stabilizer (trade name: GENORAD 16, manufactured by Rahn) | 0.05 parts |
| Vinyl ether (trade name: RAPI-CURE DVE-3, manufactured by ISP Europe: corresponding to the (D) component) | 10.0 parts |
| Photopolymerization initiator (trade name: LUCIRIN TPO, manufactured by BASF: corresponding to the (A) component) | 8.5 parts |
| Photopolymerization initiator (benzophenone: corresponding to the (A) component) | 4.0 parts |
| Photopolymerization initiator (trade name: IRGACURE 184, manufactured by Ciba Specialty Chemicals: corresponding to the (A) component) | 4.0 parts |
| Defoamer (trade name: BYK 307, manufactured by BYK Chemie) | 0.05 parts |

The thus-obtained cyan ink was printed on a sheet made of polyvinyl chloride and exposed to irradiation by passing under a ray emitted from an ultraviolet lamp (power: 120 W/cm) which was subjected to an iron-doping treatment at a speed of 40 m/mim. The resulted printed matter prepared with this ink was evaluated in a same manner as in Example 1. The results thereof are shown in the following Table 1.

Comparative Example 2

Components described below were mixed with a high-speed water-cooled mixer, to thereby obtain a cyan ink for UV inkjet.
Cyan Ink Composition

| | |
|---|---|
| Lauryl acrylate (trade name: NK ESTER LA, manufactured by Shin-Nakamura Chemical Co., Ltd.) | 31.0 parts |
| Acrylate monomer (trade name: ACTILANE 421*, manufactured by Akcros Chemicals: corresponding to the (D) component) | 26.0 parts |
| UV thinner (trade name: PHOTOMER 2017, manufactured by E Chem: corresponding to the (D) component) | 12.4 parts |
| Dispersant (trade name: SOLSPERSE 32000, manufactured by Noveon, Inc.) | 0.4 parts |
| Pigment (trade name: IRGALITE BLUE GLVO, manufactured by Ciba Specialty Chemicals: corresponding to the (C) component) | 3.6 parts |
| Stabilizer (trade name: GENORAD 16, manufactured by Rahn) | 0.05 parts |
| Vinyl ether (trade name: RAPI-CURE DVE-3, manufactured by ISP Europe: corresponding to the (D) component) | 10.0 parts |
| Photopolymerization initiator (trade name: LUCIRIN TPO, manufactured by BASF: corresponding to the (A) component) | 8.5 parts |
| Photopolymerization initiator (benzophenone: corresponding to the (A) component) | 4.0 parts |
| Photopolymerization initiator (trade name: IRGACURE 184, manufactured by Ciba Specialty Chemicals: corresponding to the (A) component) | 4.0 parts |
| Defoamer (trade name: BYK 307, manufactured by BYK Chemie) | 0.05 parts |

The thus-obtained cyan ink composition was printed on a sheet made of polyvinyl chloride and exposed to irradiation by passing under a ray emitted from an ultraviolet lamp (power: 120 W/cm) which was subjected to an iron-doping treatment at a speed of 40 m/mim. The resulted printed matter prepared with this ink was evaluated in a similar manner as for Example 1. The results thereof are shown in the following Table 1.

TABLE 1

| | Curing sensitivity Cumulative exposure light amount (mJ/cm²) | Curability | Adhesion | Flexibility |
|---|---|---|---|---|
| Example 1 | 330 | Favorable | 4B | 4 |
| Example 2 | 330 | Favorable | 3B | 3 |
| Example 3 | 330 | Favorable | 4B | 4 |
| Example 4 | 330 | Favorable | 4B | 5 |
| Example 5 | 330 | Favorable | 3B | 4 |
| Example 6 | 330 | Favorable | 3B | 3 |
| Comparative Example 1 | 330 | Favorable | 2B | 2 |
| Comparative Example 2 | 330 | Inferior | — | — |

As is apparent from Table 1, all of the ink compositions of Examples 1 to 6 were cured with a high sensitivity and were excellent in all of evaluation items, namely, curability in image portions, adhesion to recording media, and flexibility of the formed images, and proved to be at such a level as having no practical problem.

In contrast, the ink composition of Comparative Example 1, which does not contain the (B) component but contains a difunctional acrylate as a major component, showed a favorable curability but showed an insufficient adhesion such that the result of cross-hatch test was at a practically problematic level. Further, the ink composition of Comparative Example 2, which contained lauryl acrylate in place of the (B) component, was insufficient in curability, and thus the cured film thereof was unable to be evaluated.

Example 7

Preparation of Support

An aluminum alloy containing 0.06% by weight of Si, 0.30% by weight of Fe, 0.025% by weight of Cu, 0.001% by weight of Mn, 0.001% by weight of Mg, 0.001% by weight of Zn, and 0.03% by weight of Ti, with its balance being Al and inevitable impurities, was melted, filtered, and cast into an ingot having a thickness of 500 mm and a width of 1200 mm in a DC casting method. Using a surface cutter, its surface was cut off to an average depth of 10 mm. Then, this was soaked at 550° C. for about 5 hours, and after its temperature lowered to 400° C., this was hot-rolled into a sheet having a thickness of 2.7 mm. Then, this was immediately annealed at 500° C. using a continuous annealing device, and then cold-rolled into a sheet having a thickness of 0.24 mm. An average crystalline particle diameter of a shorter diameter of aluminum in the thus-obtained aluminum plate was 50 µm, and an average crystalline particle diameter of a longer diameter of aluminum in the thus-obtained aluminum plate was 300 µm. The aluminum plate was cut to have a width of 1030 mm, and then processed according to the following surface-treating processes.

The following processes (a) to (j) were performed in a succeeding manner for surface treating. Liquid adhered to the aluminum plate was removed by a nip roll after each of the following processes and washings.

(a) Mechanical Surface-Roughening

Using rotary nylon brush rolls, the surface of the aluminum plate was mechanically roughened while an abrasive slurry prepared by suspending an abrasive (silica sand) having a specific gravity of 1.12 in water was applied thereto. The abrasive had a mean particle diameter of 30 µm and a maximum particle size of 100 µm. The nylon brushes were made of 6,10-nylon, the length of each nylon hair was 45 mm, and the diameter thereof was 0.3 mm. The nylon hairs were densely planted in many holes formed in a stainless cylinder having a diameter of 300 mm to construct the nylon brushes. Three such rotary nylon brush rolls were used. Two support rolls (each having a diameter of 200 mm) were disposed below the brush rolls, spaced from them by 300 mm. The brush rolls were pressed against the aluminum plate to such a degree that the load of the power motor to drive the brush rolls increased by 7 kW over the load thereof to the brush rolls not kept in contact with the aluminum plate. The direction of the brush rotation was the same as the traveling direction of the aluminum plate. The number of brush revolutions was 200 rpm.

(b) Etching with Alkali

Thus mechanically roughened aluminum plate was etched by spraying it with an aqueous alkali solution having a sodium hydroxide concentration of 2.6% by weight and an aluminum ion concentration of 6.5% by weight at 70° C. An amount of the aluminum plate etched thereby was 10.0 g/m$^2$. Then, the etched aluminum plate was washed with a spray of water.

(c) Desmutting

Thus etched aluminum plate was desmutted by spraying it with an aqueous solution of 1 wt. % nitric acid (containing 0.5% by weight of aluminum ions) at 30° C., and then washed with a spray of water. The aqueous nitric acid solution used for the desmutting is a waste in a process of AC electrochemical surface roughening in an aqueous nitric acid solution.

(d) Electrochemical Surface-Roughening

Subsequently, the aluminum plate was electrochemically surface-roughened at an alternating current voltage of 60 Hz. The electrolytic solution used is an aqueous nitric acid solution of 10.5 g/liter (containing 5 g/liter of aluminum ions and 0.007% by weight of ammonium ions), and a temperature thereof was 50° C. A waveform of an alternating current source used therein was trapezoid, brachymorphic current having a period from the time that the current value was zero to the time that the current value leached to a peak was 0.8 msec and a duty ratio of was 1:1. A carbon electrode was therein used as a counter electrode. Ferrite was used as a material for an auxiliary anode.

The current density was 30 A/dm$^2$ as the peak current; and the quantity of electricity was 220 C/dm$^2$ in terms of the total quantity of electricity to the aluminum plate serving as an anode. 5% of the current from the power source was divided to the auxiliary electrode. Further, the aluminum plate was washed with a spray of water.

(e) Alkali Etching

Subsequently, the aluminum plate was further etched by spraying it with an aqueous alkali solution having a concentration of 26% by weight of sodium hydroxide and a concentration of 6.5% by weight of aluminum ion at 32° C. An amount of the aluminum plate etched thereby was 0.50 g/m$^2$. This is performed in order to remove the smut component which is essentially formed of aluminum hydroxide and is formed in the previous AC electrochemical surface-roughening treatment, and in order to dissolve the edges of the pits, which were also formed in the previous treatment, so as to make the pits smooth. Further, the aluminum plate was washed with a spray of water.

(f) Desmutting

The aluminum plate was again desmutted by spraying it with an aqueous solution containing 15 wt. % of sulfuric acid (containing 4.5% by weight of aluminum ions) at 30° C. Next, this was washed with a spray of water. A waste liquid, which was formed by the electrochemical surface-roughening using alternating current in the aqueous nitric acid solution, was used as the aqueous solution containing sulfuric acid in this desmutting.

(g) Electrochemical Surface-Roughening

Subsequently, the aluminum plate was electrochemically surface-roughened at an alternating current voltage of 60 Hz. The electrolytic solution used is an aqueous hydrochloric acid solution of 5.0 g/liter (containing 5 g/liter of aluminum ions), and a temperature thereof was 35° C. A waveform of an alternating current source used therein was trapezoid, brachymorphic current having a period from the time that the current value was zero to the time that the current value leached to a peak was 0.8 msec and a duty ratio of was 1:1. A carbon electrode was therein used as a counter electrode. Ferrite was used as a material for an auxiliary anode.

The current density was 25 A/dm$^2$ as the peak current; and the quantity of electricity was 50 C/dm$^2$ in terms of the total quantity of electricity to the aluminum plate serving as an anode. Further, the aluminum plate was washed with a spray of water.

(h) Alkali Etching

Subsequently, the aluminum plate was further etched by spraying it with an aqueous alkali solution having a concentration of 26% by weight of sodium hydroxide and a concentration of 6.5% by weight of aluminum ion at 32° C. An amount of the aluminum plate etched thereby was 0.12 g/m2. This is performed in order to remove the smut component which is essentially formed of aluminum hydroxide and is formed in the previous AC electrochemical surface-roughening treatment, and in order to dissolve the edges of the pits, which were also formed in the previous treatment, so as to make the pits smooth. Further, the aluminum plate was washed with a spray of water.

(i) Desmutting

The aluminum plate was again desmutted by spraying it with an aqueous solution containing 25 wt. % of sulfuric acid (containing 0.5% by weight of aluminum ions) at 60° C. Next, this was washed with a spray of water.

(j) Anodic Oxidation

Subsequently, the aluminum plate was subjected to anodic oxidation, using a two-stage electrolytic anodic oxidation device. In the device, the length of the first and second electrolysis units is 6 m each; the length of the first and second power supply units is 3 m each; and the length of the first and second power supply electrodes is 2.4 m each. The electrolyte supplied to the first and second electrolysis units is sulfuric acid. The electrolyte had a sulfuric acid concentration of 170 g/liter, and contained 0.5% by weight of aluminum ions. Its temperature was 43° C. Thus processed, the aluminum plate was washed with a spray of water. The amount of the final oxide film formed was 2.7 g/m$^2$.

Preparation and Evaluation of Planographic Printing Plate

An image was formed on an aluminum support obtained by surface treating the aluminum plate as described above by using the ink composition of Example 1 and cured in a similar manner as in Example 1 so as to form a planographic printing plate of Example 7.

The quality of an image obtained by printing with the planographic printing plate and the printing durability of the planographic printing plate of Example 7 were evaluated as follows.

Evaluation of Image on Printed Sheet

The planographic printing plate was set in a printer (trade name: HEIDEL KOR-D, manufactured by Heidelberg) and printing was performed with supplying a ink for sheet printing (trade name: VALUES-G (RED), manufactured by Dai-Nippon Ink Chemical Industry) and dampening water (trade name: ECOLITY 2, manufactured by Fuji Film Corporation).

After 100 sheets were printed thereby, an image on a 100th printed sheet was visually evaluated. As a result thereof, it was confirmed that the image on the printed sheet was good with neither an imageless portion in the image area nor a stain in the non-image area thereof.

Evaluation of Printing Durability

After the above, the printing operation was continued to observe that 5,000 sheets or more prints obtained thereby exhibited high quality with neither an imageless portion in the image area nor a stain in the non-image area. It was thus confirmed that the planographic printing plate of Example 7 can be evaluated as having no practical problem.

As a result thereof, it was found that the planographic printing plate formed by using the ink composition of the invention is capable of forming a printed image having a high quality as well as has good printing durability, and thus the ink composition of the invention can be preferably used for forming a planographic printing plate.

Example 8

A cyan ink for UV inkjet of Example 8 was obtained and evaluated in a similar manner as in Example 1 except that components described below were used. The results are shown in Table 2.

Cyan Ink Composition

| | |
|---|---|
| Specific polymerizable compound [exemplary compound (B'-1): corresponding to the (B') component] | 23.0 parts |
| Lauryl acrylate (trade name: NK ESTER LA, manufactured by Shin-Nakamura Chemical Co., Ltd.) | 7.0 parts |
| Acrylate monomer (trade name: ACTILANE 421*, manufactured by Akcros Chemicals: corresponding to the (D) component) | 27.0 parts |
| UV thinner (trade name: PHOTOMER 2017, manufactured by E Chem: corresponding to the (D) component) | 12.4 parts |
| Dispersant (trade name: SOLSPERSE 32000, manufactured by Noveon, Inc.) | 0.4 parts |
| Pigment (trade name: IRGALITE BLUE GLVO, manufactured by Ciba Specialty Chemicals: corresponding to the (C) component) | 3.6 parts |
| Stabilizer (trade name: GENORAD 16, manufactured by Rahn) | 0.05 parts |
| Vinyl ether (trade name: RAPI-CURE DVE-3, manufactured by ISP Europe: corresponding to the (D) component) | 10.0 parts |
| Photopolymerization initiator (trade name: LUCIRIN TPO, manufactured by BASF: corresponding to the (A) component) | 8.5 parts |
| Photopolymerization initiator (benzophenone: corresponding to the (A) component) | 4.0 parts |
| Photopolymerization initiator (trade name: IRGACURE 184, manufactured by Ciba Specialty Chemicals: corresponding to the (A) component) | 4.0 parts |
| Defoamer (trade name: BYK 307, manufactured by BYK Chemie) | 0.05 parts |

The ink composition of Example 8 has a high adhesion, and a value of the adhesion was evaluated as 3B in accordance with the ASTM method, which is applicable for practical use.

Example 9

A magenta ink for UV inkjet of Example 9 was obtained and evaluated in a similar manner as in Example 2 except that 14.0 parts of the exemplary compound (B'-2) was used in place of 14.0 parts of the exemplary compound (B-3). The results are shown in Table 2.

Example 10

A yellow ink for UV inkjet of Example 10 was obtained and evaluated in a similar manner as in Example 3 except that 12.0 parts of the exemplary compound (B'-1) was used in place of 12.0 parts of the exemplary compound (B-2). The results are shown in Table 2.

Example 11

A black ink for UV inkjet of Example 11 was obtained and evaluated in a similar manner as in Example 4 except that 34.0 parts of the exemplary compound (B'-1) was used in place of 34.0 parts of the exemplary compound (B-2). The results are shown in Table 2.

Example 12

A cyan ink for UV inkjet of Example 12 was obtained and evaluated in a similar manner as in Example 5 except that 32.0 parts of the exemplary compound (B'-4) was used in place of 32.0 parts of the exemplary compound (B-2) and, then, a printed matter was obtained. The results are shown in Table 2.

Example 13

A cyan ink for UV inkjet of Example 13 was obtained and evaluated in a similar manner as in Example 6 except that 30.0 parts of the exemplary compound (B'-3) was used in place of 30.0 parts of the exemplary compound (B-3) and, also, 3.0 parts of exemplary compound (B'-4) was used in place of 3.0 parts of exemplary compound (B-14). The results are shown in Table 2.

Example 14

Components described below were mixed with a high-speed water-cooled mixer, to thereby obtain a magenta ink for UV inkjet.

Magenta Ink Composition

| | |
|---|---:|
| Specific polymerizable compound [exemplary compound (B'-7): corresponding to the (B') component] | 11.0 parts |
| Lauryl acrylate (trade name: NK ESTER LA, manufactured by Shin-Nakamura Chemical Co., Ltd.) | 6.0 parts |
| Acrylate monomer (trade name: ACTILANE 421*, manufactured by Akcros Chemicals: corresponding to the (D) component) | 38.4 parts |
| UV thinner (trade name: PHOTOMER 2017, manufactured by E Chem: corresponding to the (D) component) | 16.0 parts |
| Dispersant (trade name: SOLSPERSE 32000, manufactured by Noveon, Inc.) | 0.4 parts |
| Pigment (trade name: CINQUASIA MAZENTA RT-355D, manufactured by Ciba Specialty Chemicals: corresponding to the (C) component) | 3.6 parts |
| Stabilizer (trade name: GENORAD 16, manufactured by Rahn) | 0.05 parts |
| Vinyl ether (trade name: RAPI-CURE DVE-3, manufactured by ISP Europe: corresponding to the (D) component) | 8.0 parts |
| Photopolymerization initiator (trade name: LUCIRIN TPO, manufactured by BASF: corresponding to the (A) component) | 8.5 parts |
| Photopolymerization initiator (benzophenone: corresponding to the (A) component) | 4.0 parts |
| Photopolymerization initiator (trade name: IRGACURE 184, manufactured by Ciba Specialty Chemicals: corresponding to the (A) component) | 4.0 parts |
| Defoamer (trade name: BYK 307, manufactured by BYK Chemie) | 0.05 parts |

The thus-obtained magenta ink composition was printed on a sheet made of polyvinyl chloride and exposed to irradiation by passing under a ray emitted from an ultraviolet lamp (power: 120 W/cm) which was subjected to an iron-doping treatment at a speed of 40 m/mim. The resulted printed matter prepared with this ink was evaluated in a similar manner as for Example 1. The results thereof are shown in the following Table 2.

Comparative Example 3

Components described below were mixed with a high-speed water-cooled mixer, to thereby obtain a cyan ink for UV inkjet.

Cyan Ink Composition

| | |
|---|---:|
| Lauryl acrylate (trade name: NK ESTER LA, manufactured by Shin-Nakamura Chemical Co., Ltd.) | 7.0 parts |
| Acrylate monomer (trade name: ACTILANE 421*, manufactured by Akcros Chemicals: corresponding to the (D) component) | 50.0 parts |
| Photomer 2017 (UV thinner from E Chem) | 12.4 parts |
| Dispersant (trade name: SOLSPERSE 32000, manufactured by Noveon, Inc.) | 0.4 parts |
| Pigment (trade name: IRGALITE BLUE GLVO, manufactured by Ciba Specialty Chemicals: corresponding to the (C) component) | 3.6 parts |
| Stabilizer (trade name: GENORAD 16, manufactured by Rahn) | 0.05 parts |
| Vinyl ether (trade name: RAPI-CURE DVE-3, manufactured by ISP Europe: corresponding to the (D) component) | 10.0 parts |
| Photopolymerization initiator (trade name: LUCIRIN TPO, manufactured by BASF: corresponding to the (A) component) | 8.5 parts |
| Photopolymerization initiator (benzophenone: corresponding to the (A) component) | 4.0 parts |
| Photopolymerization initiator (trade name: IRGACURE 184, manufactured by Ciba Specialty Chemicals: corresponding to the (A) component) | 4.0 parts |
| Defoamer (trade name: BYK 307, manufactured by BYK Chemie) | 0.05 parts |

The thus-obtained cyan ink composition was printed on a sheet made of polyvinyl chloride and exposed to irradiation by passing under a ray emitted from an ultraviolet lamp (power: 120 W/cm) which was subjected to an iron-doping treatment at a speed of 40 m/mim. The resulted printed matter prepared with this ink was evaluated in a similar manner as for Example 1. The results thereof are shown in the following Table 2.

Comparative Example 4

Components described below were mixed with a high-speed water-cooled mixer, to thereby obtain a cyan ink for UV inkjet.

Cyan Ink Composition

| | |
|---|---|
| Lauryl acrylate (trade name: NK ESTER LA, manufactured by Shin-Nakamura Chemical Co., Ltd.) | 30.0 parts |
| Acrylate monomer (trade name: ACTILANE 421*, manufactured by Akcros Chemicals: corresponding to the (D) component) | 27.0 parts |
| UV thinner (trade name: PHOTOMER 2017, manufactured by E Chem: corresponding to the (D) component) | 12.4 parts |
| Dispersant (trade name: SOLSPERSE 32000, manufactured by Noveon, Inc.) | 0.4 parts |
| Pigment (trade name: IRGALITE BLUE GLVO, manufactured by Ciba Specialty Chemicals: corresponding to the (C) component) | 3.6 parts |
| Stabilizer (trade name: GENORAD 16, manufactured by Rahn) | 0.05 parts |
| Vinyl ether (trade name: RAPI-CURE DVE-3, manufactured by ISP Europe: corresponding to the (D) component) | 10.0 parts |
| Photopolymerization initiator (trade name: LUCIRIN TPO, manufactured by BASF: corresponding to the (A) component) | 8.5 parts |
| Photopolymerization initiator (benzophenone: corresponding to the (A) component) | 4.0 parts |
| Photopolymerization initiator (trade name: IRGACURE 184, manufactured by Ciba Specialty Chemicals: corresponding to the (A) component) | 4.0 parts |
| Defoamer (trade name: BYK 307, manufactured by BYK Chemie) | 0.05 parts |

The thus-obtained cyan ink composition was printed on a sheet made of polyvinyl chloride and exposed to irradiation by passing under a ray emitted from an ultraviolet lamp (power: 120 W/cm) which was subjected to an iron-doping treatment at a speed of 40 m/mim. The resulted printed matter prepared with this ink was evaluated in a similar manner as for Example 1. The results thereof are shown in the following Table 2.

TABLE 2

| | Exposure amount (mJ/cm$^2$) | Curability | Adhesion |
|---|---|---|---|
| Example 8 | 330 | Favorable | 3B |
| Example 9 | 330 | Favorable | 3B |
| Example 10 | 330 | Favorable | 4B |
| Example 11 | 330 | Favorable | 3B |
| Example 12 | 330 | Favorable | 3B |
| Example 13 | 330 | Favorable | 3B |
| Example 14 | 330 | Favorable | 3B |
| Comparative Example 3 | 330 | Favorable | 1B |
| Comparative Example 4 | 330 | Inferior | — |

As is apparent from Table 2, all of the ink compositions of Examples 8 to 14 were cured with a high sensitivity and were excellent in all of evaluation items, namely, curability in image portions and adhesion to recording mediums, and proved to be at such a level as having no practical problem.

On the other hand, the ink composition of Comparative Example 3, which did not contain the (B') component but contained a difunctional acrylate as a major component, showed a favorable curability but showed an insufficient adhesion such that the result of cross-hatch test was at a level having a practical problem. Further, the ink composition of Comparative Example 4, which contained lauryl acrylate in place of the (B') component, was insufficient in curability, and therefore, the cured film thereof was unable to be evaluated.

Example 15

A planographic printing plate was prepared and evaluated in a similar manner as in Example 7 except that the ink composition of Example 8 was used in place of that of Example 1.

As a result thereof, it was confirmed that the image on the printed sheet was good with neither an imageless portion in the image area nor a stain in the non-image area thereof.

After the above, the printing operation was continued to observe that 20,000 sheets or more prints obtained thereby exhibited high quality with neither an imageless portion in the image area nor a stain in the non-image area. It was thus confirmed that the planographic printing plate of Example 15 can be evaluated as having no practical problem.

As a result thereof, it was found that the planographic printing plate formed by using the ink composition of the invention is capable of forming a printed image having a high quality as well as has good printing durability, and thus the ink composition of the invention can be preferably used for forming a planographic printing plate.

CROSS-REFERENCE TO RELATED APPLICATION

This application claims priority under 35 USC 119 from Japanese patent Application Nos. 2005-380032 and 2005-380033, the disclosures of which are incorporated by reference herein.

What is claimed is:

1. An inkjet recording composition comprising an ultraviolet ray-curable ink composition, the ultraviolet ray-curable ink composition comprising:
   (a) a polymerization initiator;
   (b) an ester or amide of (meth)acrylic acid having a 1,3-dioxane ring skeleton;
   (c) a colorant; and
   (d) a polymerizable compound which is other than the ester or amide of (meth)acrylic acid having a 1,3-dioxane ring skeleton, wherein the ultraviolet ray-curable ink composition further comprises a polymerization inhibitor, the ultraviolet ray-curable ink composition contains no solvent or a solvent in an amount of 0.1 to 3% by weight with respect to the total weight of the ultraviolet ray-curable ink composition, the ink viscosity is from 7 to 25 mPa·s at the temperature at the time of ejection, the colorant is a pigment dispersed in the ultraviolet ray-curable ink composition with a dispersant, the ester or amide of (meth)acrylic acid having a 1,3-dioxane ring skeleton is represented by the following structural formula (B-14):

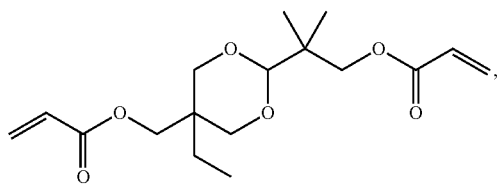

(B-14)

and the polymerizable compound which is other than the ester or amide of (meth)acrylic acid having a 1,3-dioxane ring skeleton is a combination of a monoacrylate and either a polyfunctional acrylate monomer or oligomer having a molecular weight of 400 or more.

2. The inkjet recording composition according to claim 1, wherein the content of the ester or amide of (meth)acrylic acid having a 1,3-dioxane ring skeleton is 7% by mass or more on the basis of a total amount of polymerizable compounds.

3. The inkjet recording composition according to claim 1, wherein the viscosity at 25 to 30° C. of the ink composition is from 35 to 200 mPa·s.

4. The inkjet recording composition according to claim 1, wherein the polymerization initiator comprises at least 2,4,6-Trimethylbenzoyldiphenylphosphine oxide.

5. The inkjet recording composition according to claim 1, wherein the polymerization initiator is present in a range of from 0.5 to 30% by mass on the basis of a total amount of polymerizable compounds.

6. The inkjet recording composition according to claim 1, wherein the ultraviolet ray-curable ink composition has a surface tension of from 20 to 30 mN/m.

7. The inkjet recording composition according to claim 1, wherein the polymerization initiator comprises an aromatic ketone.

8. The inkjet recording composition according to claim 1, wherein the ultraviolet ray-curable ink composition further comprises a sensitizing dye.

9. The inkjet recording composition according to claim 1, wherein the temperature at the time of ejection is 40 to 80° C.

* * * * *